United States Patent
Kim et al.

(10) Patent No.: US 10,952,208 B2
(45) Date of Patent: *Mar. 16, 2021

(54) METHOD AND APPARATUS FOR TRANSMITTING AND RECEIVING FEEDBACK IN WIRELESS COMMUNICATION SYSTEM

(71) Applicant: Samsung Electronics Co., Ltd., Suwon-si (KR)

(72) Inventors: Jaewon Kim, Seoul (KR); Eunyong Kim, Yongin-si (KR); Jeehwan Noh, Suwon-si (KR); Hyunseok Ryu, Yongin-si (KR); Hyukmin Son, Hanam-si (KR); Hyunkyu Yu, Suwon-si (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,006

(22) Filed: Nov. 7, 2019

(65) Prior Publication Data
US 2020/0077376 A1 Mar. 5, 2020

Related U.S. Application Data

(63) Continuation of application No. 16/422,164, filed on May 24, 2019, which is a continuation of application
(Continued)

(30) Foreign Application Priority Data

Nov. 14, 2016 (KR) .................. 10-2016-0151368

(51) Int. Cl.
*H04W 72/04* (2009.01)
*H04L 1/16* (2006.01)
(Continued)

(52) U.S. Cl.
CPC ............ *H04W 72/044* (2013.01); *H04L 1/08* (2013.01); *H04L 1/1614* (2013.01); *H04L 1/18* (2013.01);
(Continued)

(58) Field of Classification Search
CPC .......... H04W 72/044; H04W 74/0833; H04W 74/008; H04W 74/085; H04W 72/042;
(Continued)

(56) References Cited

U.S. PATENT DOCUMENTS 9,729,219 B2   8/2017   Chapman et al.
9,800,304 B2   10/2017  Kim et al.
(Continued)

FOREIGN PATENT DOCUMENTS

KR   10-2015-0024333 A   3/2015
KR   10-1563469 B1       10/2015
(Continued)

OTHER PUBLICATIONS

Lg Electronics', Further details on uplink transmissions for NB-IoT, R1-160621, 3GPP TSG RAN1 #84, St. Julian's, Malta Feb. 15-19, 2016.
(Continued)

*Primary Examiner* — Brenda H Pham
(74) *Attorney, Agent, or Firm* — Jefferson IP Law, LLP

(57) ABSTRACT

The present disclosure relates to a pre-5$^{th}$-generation (5G) or 5G communication system to be provided for supporting higher data rates beyond 4$^{th}$-generation (4G) communication system such as long term evolution (LTE). In a feedback method of a terminal, receiving a first subframe from a base station, detecting, from the first subframe, downlink control information (DCI) including transmission timing information and frequency resource information for feedback, creating feedback information for data decoding of the first
(Continued)

subframe to be transmitted in a second subframe determined based on the DCI, and transmitting the feedback information, based on a time resource indicated from the transmission timing information and a frequency resource indicated from the frequency resource information in the DCI.

20 Claims, 14 Drawing Sheets

Related U.S. Application Data

No. 15/477,600, filed on Apr. 3, 2017, now Pat. No. 10,305,637.

(60) Provisional application No. 62/317,943, filed on Apr. 4, 2016.

(51) Int. Cl.
| | |
|---|---|
| *H04L 1/18* | (2006.01) |
| *H04L 5/00* | (2006.01) |
| *H04W 74/08* | (2009.01) |
| *H04L 1/08* | (2006.01) |
| *H04W 74/00* | (2009.01) |
| *H04L 5/14* | (2006.01) |
| *H04B 7/06* | (2006.01) |

(52) U.S. Cl.
CPC .......... *H04L 1/1854* (2013.01); *H04L 1/1861* (2013.01); *H04L 5/0048* (2013.01); *H04L 5/0053* (2013.01); *H04L 5/14* (2013.01); *H04W 72/042* (2013.01); *H04W 72/0413* (2013.01); *H04W 74/008* (2013.01); *H04W 74/085* (2013.01); *H04W 74/0833* (2013.01); *H04B 7/0617* (2013.01)

(58) Field of Classification Search
CPC ... H04L 1/1614; H04L 1/1854; H04L 1/1861; H04L 5/0053; H04L 1/18; H04L 5/0048; H04L 1/08; H04L 5/14
See application file for complete search history.

(56) References Cited

U.S. PATENT DOCUMENTS

| | | | |
|---|---|---|---|
| 2011/0228863 A1 | 9/2011 | Papasakellariou et al. | |
| 2012/0163326 A1 | 6/2012 | Lee et al. | |
| 2012/0213163 A1 | 8/2012 | Lee et al. | |
| 2012/0230272 A1* | 9/2012 | Kim .............. | H04W 72/0446 370/329 |
| 2013/0072243 A1 | 3/2013 | Yu et al. | |
| 2013/0121185 A1 | 5/2013 | Li et al. | |
| 2013/0172002 A1 | 7/2013 | Yu et al. | |
| 2013/0301586 A1 | 11/2013 | Fan et al. | |
| 2014/0126520 A1 | 5/2014 | Quan et al. | |
| 2014/0177607 A1 | 6/2014 | Li et al. | |
| 2014/0204883 A1 | 7/2014 | Lee et al. | |
| 2015/0063179 A1 | 3/2015 | Yang et al. | |
| 2015/0117380 A1* | 4/2015 | Zhang .............. | H04B 7/024 370/329 |
| 2015/0139136 A1 | 5/2015 | Zhang et al. | |
| 2015/0208443 A1 | 7/2015 | Jung et al. | |
| 2015/0237619 A1 | 8/2015 | Yang et al. | |
| 2015/0341878 A1 | 11/2015 | Lee et al. | |
| 2016/0100382 A1* | 4/2016 | He .............. | H04L 5/0094 370/329 |
| 2016/0156454 A1 | 6/2016 | Knoryaev et al. | |
| 2016/0157267 A1 | 6/2016 | Frenne et al. | |
| 2016/0337916 A1 | 11/2016 | Deenoo et al. | |
| 2017/0214444 A1 | 7/2017 | Nigam et al. | |

FOREIGN PATENT DOCUMENTS

| | | |
|---|---|---|
| KR | 10-2016-0015821 A | 2/2016 |
| WO | 2014/027868 A1 | 2/2014 |
| WO | 2015/109153 A1 | 7/2015 |
| WO | 2015/147717 A1 | 10/2015 |

OTHER PUBLICATIONS

ZTE', UCI transmission for NB-loT, R1-161871, 3GPP TSG RAN WG1 NB-loT Ad-Hoc Meeting, Sophia Antipoils, France, Mar. 22-24, 2016.
Huawei, Hisilicon', UCI for NB-loT, R1-161808, 3GPP TSG RAN WG1 NB-loT Ad-Hoc Meeting #2, Sophia-Antipoils, France, Mar. 22-24, 2016.
Huawei Technologies Co et al: "pCR TR45.820 NB M2M—Data Transmission and Retransmission", 3GPP Draft; GPC150152 PCR 45.820, vol. TSG GERAN, No. Sophia—Antipolis, France; Apr. 20, 2015-Apr. 23, 2015, XP050945259, Apr. 20, 2015.
Extended European Search Report dated Feb. 5, 2019, issued in European Application No. 17779333.8.
Extended European Search Report dated Feb. 15, 2019, issued in European Application No. 17779317.1.
European Office Action dated Jun. 10, 2020, issued in European Patent Application No. 17779317.1.
3rd Generation Partnership Project; Technical Specification Group Radio Access Network; Evolved Universal Terrestrial Radio Access (E-UTRA); Medium Access Control (MAC) protocol specification (Release 12), 3GPP TS 36.321, V12.7.0, Sep. 24, 2015, pp. 1-77, XP050996302, Sophia Antipolis, France.
European Office Action dated Nov. 13, 2020, issued in European Application No. 17 779 333.8.

* cited by examiner

FIG. 6

| 4bit | $a_0$ | $a_1$ | $a_2$ | $a_3$ | | | | |

| 6bit | $a_0$ | $a_1$ | $a_2$ | $a_3$ | $a_4$ | $a_5$ | | |

| 8bit | $a_0$ | $a_1$ | $a_2$ | $a_3$ | $a_4$ | $a_5$ | $a_6$ | $a_7$ |

METHOD AND APPARATUS FOR TRANSMITTING AND RECEIVING FEEDBACK IN WIRELESS COMMUNICATION SYSTEM

CROSS-REFERENCE TO RELATED APPLICATION(S)

This application is a continuation application of prior application Ser. No. 16/422,164, filed on May 24, 2019, which is a continuation application of prior application Ser. No. 15/477,600, filed on Apr. 3, 2017, which has issued as U.S. Pat. No. 10,305,637 on May 28, 2019 and was based on and claimed priority under 35 U.S.C. § 119(e) of a U.S. Provisional application Ser. No. 62/317,943, filed on Apr. 4, 2016, and under 35 U.S.C § 119(a) of a Korean patent application number 10-2016-0151368, filed on Nov. 14, 2016, in the Korean Intellectual Property Office, the disclosure of which is incorporated by reference herein in its entirety.

TECHNICAL FIELD

The present disclosure relates to a method and apparatus for transmitting and receiving feedback in a wireless communication system, especially, in a time division duplex (TDD) frame structure.

BACKGROUND

To meet the demand for wireless data traffic that has increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, it is necessary to define a feedback method of a terminal for downlink transmission of a base station in an environment where various services capable of supporting the 5G communication system coexist.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving feedback in a time division duplex (TDD) frame structure of a wireless communication system. Also, the present disclosure provides a method and apparatus for performing a hybrid automatic repeat request (HARQ) procedure in a dynamic TDD frame structure.

In accordance with an aspect of the present disclosure, a feedback method of a terminal is provided. The feedback method includes receiving a first subframe from a base station, detecting, from the first subframe, downlink control information (DCI) including transmission timing information and frequency resource information for feedback, creating feedback information for data decoding of the first subframe to be transmitted in a second subframe determined based on the DCI, and transmitting the feedback information, based on a time resource indicated from the transmission timing information and a frequency resource indicated from the frequency resource information in the DCI.

In accordance with another aspect of the present disclosure, a terminal is provided. The terminal includes a transceiver unit configured to transmit or receive a signal, and at least one processor configured to receive a first subframe from a base station, detect, from the first subframe, DCI including transmission timing information and frequency resource information for feedback, create feedback information for data decoding of the first subframe to be transmitted in a second subframe determined based on the DCI, and transmit the feedback information, based on a time resource indicated from the transmission timing information and a frequency resource indicated from the frequency resource information in the DCI.

In accordance with another aspect of the present disclosure, a feedback reception method of a base station is provided. The feedback reception method includes creating DCI including transmission timing information and frequency resource information for feedback and data in a first subframe, transmitting the first subframe containing the DCI and the data to a terminal, and receiving feedback information from the terminal, based on a time resource indicated from the transmission timing information and a frequency resource indicated from the frequency resource information in the DCI.

In accordance with another aspect of the present disclosure, a base station is provided. The base station includes a transceiver unit configured to transmit or receive a signal, and at least one processor configured to create DCI including transmission timing information and frequency resource information for feedback and data in a first subframe, transmit the first subframe containing the DCI and the data to a terminal, and receive feedback information from the terminal, based on a time resource indicated from the transmission timing information and a frequency resource indicated from the frequency resource information in the DCI.

In accordance with another aspect of the present disclosure, the base station may indicate resources for HARQ feedback transmission to the terminal by using the DCI, and the terminal may transmit an HARQ feedback by using the resources indicated by the base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram illustrating a bitmap according to an embodiment of the present disclosure;

Throughout the drawings, it should be noted that like reference numbers are used to depict the same or similar elements, features, and structures.

DETAILED DESCRIPTION

Figure 1:
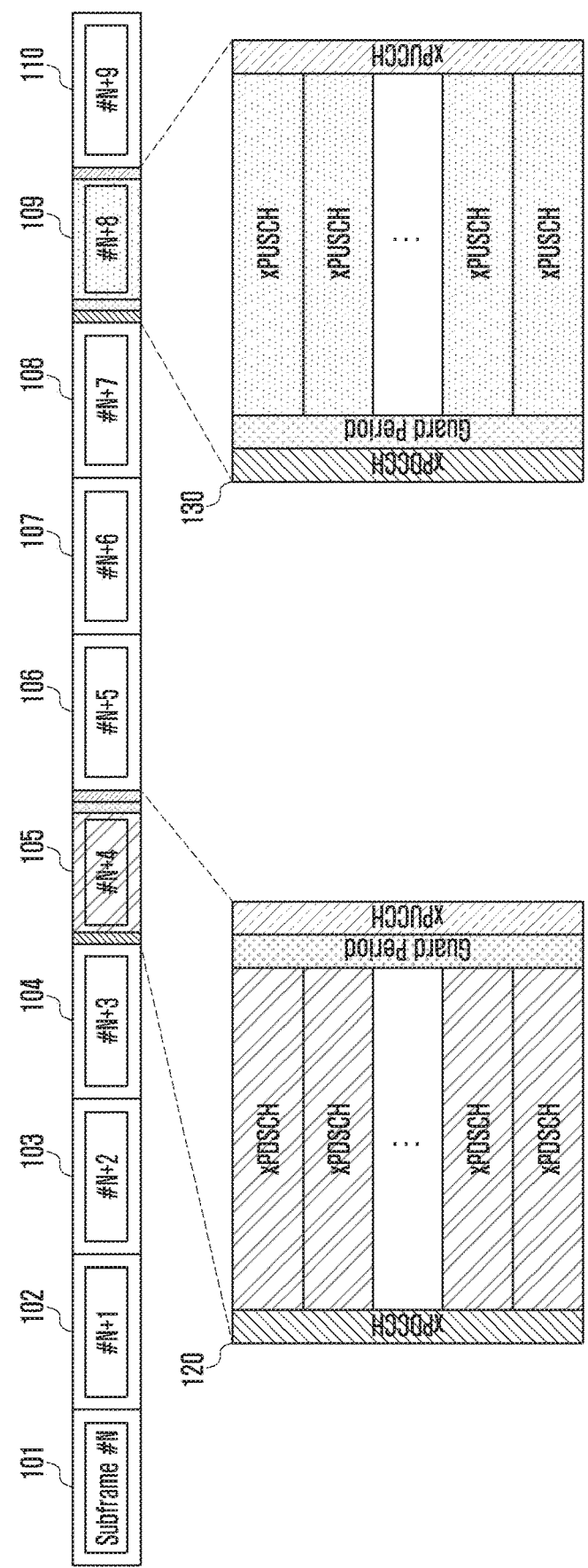
FIG. 1 is a diagram illustrating a time division duplex (TDD) frame structure according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

In this present disclosure, terms are defined in consideration of functions of the present disclosure and may be varied depending on user or operator's intention or custom. Therefore, the definition should be made based on the contents throughout this description. For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the various embodiments described in detail below with reference to the accompanying drawings. The present disclosure may, however, be embodied in many different forms and should not be construed as limited to the various embodiments set forth herein. Rather, these various embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Efforts have been made to develop an improved $5^{th}$ generation (5G) communication system after commercialization of the $4^{th}$ generation (4G) communication system. The main feature of the 5G communication system is to support various service scenarios having different requirements in comparison with the 4G communication system. These requirements may be a latency, a data rate, a battery life, the number of concurrent users, communication coverage, and the like.

For example, the enhanced mobile broad band (eMBB) service aims at a data transmission rate that is 100 times or more higher than that of the 4G communication system, and may be regarded as a service for supporting a surge of user data traffic. As another example, the ultra-reliable and low latency (URLL) service aims at very high data transmission/reception reliability and very low latency in comparison with the 4G communication system, and may be useful for autonomous driving, e-health, drones, and other services. As still another example, the massive machine-type-communication (mMTC) service aims to support a greater number of device-to-device communications per area in comparison with the 4G communication system, and is an evolved service of the 4G MTC such as smart metering.

The present disclosure relates to a method and apparatus for feedback of a terminal with regard to downlink transmission of a base station in an environment where various services capable of supporting the 5G communication system coexist.

In a general cellular system (e.g., the long term evolution (LTE) system), the terminal receives a physical downlink control channel (PDCCH) transmitted from the base station.

The PDCCH is transmitted in a control channel region on the first, second or third symbol of every subframe (1 ms), and the control channel region is transmitted over the entire system bandwidth on the frequency axis. For example, in a system with a bandwidth of 20 MHz, the control channel region for the PDCCH occupies the first, second or third symbol of the subframe on the time axis and 20 MHz on the frequency axis. As another example, in a system with a bandwidth of 5 MHz, the control channel region for the PDCCH occupies the first, second or third symbol of the subframe on the time axis and 5 MHz on the frequency axis. In the PDCCH, DCI information such as resource allocation information of the terminal is transmitted. The number of symbols used for forming the PDCCH may be transmitted to the terminal through a separate physical control format indication channel (PCFICH). This PCFICH may not be present, depending on the communication system.

The PDCCH is scrambled with a variety of radio network temporary identifications (RNTIs) (or may be referred to as a radio identifier) according to the use, and is transmitted to the terminal. For example, the P-RNTI is an RNTI related to paging, the RA-RNTI is an RNTI related to random access, the SI-RNTI is an RNTI related to system information, and the C-RNTI is an RNTI related to the downlink or uplink resource allocation. The terminal receives the PDCCH transmitted at every subframe, performs descrambling through the RNTI, and then decodes the PDCCH.

Meanwhile, in the 5G communication system, different transmission time interval (TTIs) may be considered for each service in order to satisfy different requirements for each service. For example, in case of the URLL service, it is possible to use a shorter TTI (e.g., 0.2 ms) to meet the requirement of short latency. In case of the mMTC service, it is possible to use a longer TTI (e.g., 2 ms) to meet the requirement of wide coverage (The longer TTI may increase coverage because it may transmit longer with a lot of energy).

The terms used in various embodiments of the present disclosure described below may be defined as follows.

In various embodiments of the present disclosure, feedback information may refer to information that indicates whether decoding of data transmitted from the base station is successful or not. Instead of the feedback information, other terms such as hybrid automatic repeat request (HARQ) information, HARQ feedback information, and feedback result may be used.

In various embodiments of the present disclosure, transmission timing information for feedback may be referred to as transmission time information, time resources, offset information, time information, and the like. Frequency information of x physical uplink control channel (xPUCCH) for feedback may be referred to as frequency resources, frequency information, and the like.

In various embodiments of the present disclosure, resources for feedback may include time resources for feedback and frequency resources for feedback. The time resources may be indicated based on the transmission timing information, and the frequency resources may be indicated based on the frequency information.

Receiving a subframe may be interpreted as receiving information, data, and signals that are mapped to the subframe or mapped to resources of the subframe.

FIG. 1 is a diagram illustrating a time division duplex (TDD) frame structure according to an embodiment of the present disclosure. A TDD frame shown in FIG. 1 may be a dynamic TDD frame. The TDD frame of FIG. 1 is not to be construed as a limitation.

Referring to FIG. 1, the TDD frame according to an embodiment may include a plurality of subframes 101, 102, 103, ..., 110, which may constitute a single radio frame. In the LTE communication, ten subframes may constitute one radio frame. In this embodiment, n 5G subframes may constitute one radio frame. For example, the unknown n may be 50. The value of n may be set to a different value depending on the communication system.

A reference numeral 120 denotes an enlarged view of the structure of a subframe 105, and a reference numeral 130 denotes an enlarged view of the structure of a subframe 109. The reference numeral 120 indicates a subframe including a downlink control channel, a downlink data channel, and an uplink control channel The reference numeral 130 indicates a subframe including a downlink control channel, an uplink data channel, and an uplink control channel In a subframe, the horizontal axis is the time domain, and the vertical axis is the frequency domain. The horizontal axis may be composed of symbols, and the vertical axis may be composed of subcarriers. In the 5G system, symbol units and subcarrier units may be configured in various ways. A subframe including x physical downlink shared channel (xPDSCH) may be referred to as a downlink subframe, and a subframe including x physical uplink control channel (xPUSCH) may be referred to as an uplink subframe. In the dynamic TDD system, the base station may directly schedule a subframe to be used as an uplink subframe or a downlink subframe. In the dynamic TDD system, after downlink control information (DCI) decoding of a received subframe, the terminal may identify whether a corresponding subframe is a downlink subframe or an uplink subframe.

Referring to the reference numeral 120, a subframe may include an xPDCCH region and an xPDSCH region. The subframe 120 is a downlink subframe. The xPDCCH is a downlink control channel used in the 5G system and may be hereinafter referred to as the downlink control channel The xPDSCH is a downlink data channel used in the 5G system and may be hereinafter referred to as the downlink data channel The subframe may further include xPUCCH. The xPUCCH is an uplink control channel used in the 5G system and may be hereinafter referred to as the uplink control channel. A guard period may be configured between the xPDSCH and the xPUCCH so as to minimize an error due to a change from the downlink to the uplink. In some subframes, the xPUCCH may not be configured.

Referring to the reference numeral 130, a subframe may include an xPDCCH region and an xPUSCH region. The subframe 130 is an uplink subframe. The xPUSCH is an uplink data channel used in the 5G system and may be hereinafter referred to as the uplink data channel The subframe may also include an xPUCCH region. A guard period may be configured between the xPDCCH and the xPUSCH, thereby minimizing an error due to a change from the downlink to the uplink.

Like this structure 120 or 130, the first orthogonal frequency division multiplexing (OFDM) symbol in one subframe is a transmission section of the xPDCCH in which a DCI may be transmitted. The DCI transmitted in the xPDCCH may perform scheduling for the PDSCH transmitted in the same subframe. In addition, the DCI transmitted in the xPDCCH may perform scheduling for the xPUSCH and the xPUCCH received in the subsequent subframe. Namely, the xPDSCH, the xPUSCH, and the xPUCCH may be scheduled by the DCI. The xPUCCH may be configured to the last OFDM symbol of the subframe.

The subframe including the xPDSCH may be referred to as a downlink subframe, and the subframe including the xPUSCH may be referred to as an uplink subframe. In various embodiments of the present disclosure, the dynamic TDD system means that the TDD frame is not determined in advance and the subframe configuration method is determined by the DCI. In the dynamic TDD system, the subframe configuration may be determined dynamically by the DCI without being determined for a predetermined order or pattern.

Figure 2:
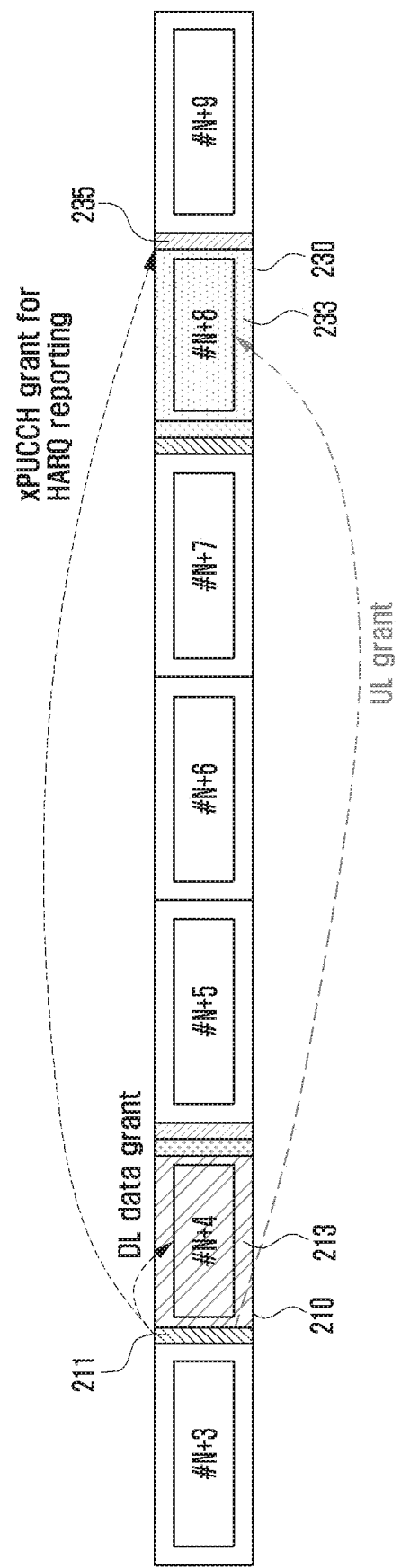
FIG. 2 is a diagram illustrating a method for scheduling a subframe according to an embodiment of the present disclosure.

FIG. 2 is a diagram illustrating a method for scheduling a subframe according to an embodiment of the present disclosure.

Referring to FIG. 2, a subframe 210 of FIG. 2 corresponds to the subframe 105 of FIG. 1, and a subframe 230 of FIG. 2 corresponds to the subframe 109 of FIG. 1. The DCI transmitted in an xPDCCH 211 of the subframe 210 may schedule a xPDSCH 213 of the subframe 210. Also, the DCI transmitted in the xPDCCH 211 of the subframe 210 may perform scheduling for an xPUSCH 233 of the subframe 230 (UL grant) and may perform scheduling for an xPUCCH 235 of the subframe 230. Feedback information that indicates whether a downlink data channel is decoded may be transmitted through the xPUCCH 235. The feedback information may be referred to as HARQ. Therefore, HARQ reporting for the xPUCCH 235 may be scheduled by the DCI transmitted via the xPDCCH 211.

Specifically, when the base station transmits downlink data in the subframe 210, the base station may transmit information for scheduling of downlink data and information for HARQ feedback through the DCI. The DCI may include the following information.

- Information delivered for receiving and decoding downlink data (e.g., including at least one of allocation information of time and frequency resources used for xPDSCH transmission, modulation and coding scheme (MCS) information, rank information, DMRS information, HARQ process information, information about whether to retransmit HARQ, and the like)
- Information about transmission time and frequency resources of the xPUCCH to transmit HARQ feedback
- Bitmap index information (BMI)

In case of a system in which resources for HARQ feedback are predetermined, the HARQ feedback may be transmitted using time and frequency resources of a predetermined subframe after receiving a downlink data channel. However, when the base station dynamically configures downlink and uplink subframes through DCI in the TDD system as in various embodiments of the present disclosure, resources for the HARQ feedback may not be configured in advance. Therefore, according to the present disclosure as mentioned above, information about time and frequency resources of the xPUCCH to transmit the HARQ feedback and information about bitmap index may be provided through the DCI. The BMI is information indicating location information in the bitmap and may indicate the (N+1)-th bit in the bitmap. The terminal may update feedback information (HARQ ACK/NACK) about data scheduled by the DCI to the (N+1)-th bit of a bitmap message indicated by the BMI, and report it in the subframe and frequency resource indicated as the xPUCCH resource. If a plurality of DCIs indicates the same subframe 1 as the xPUCCH resource, the BMI value may be different for each DCI.

Figure 3:
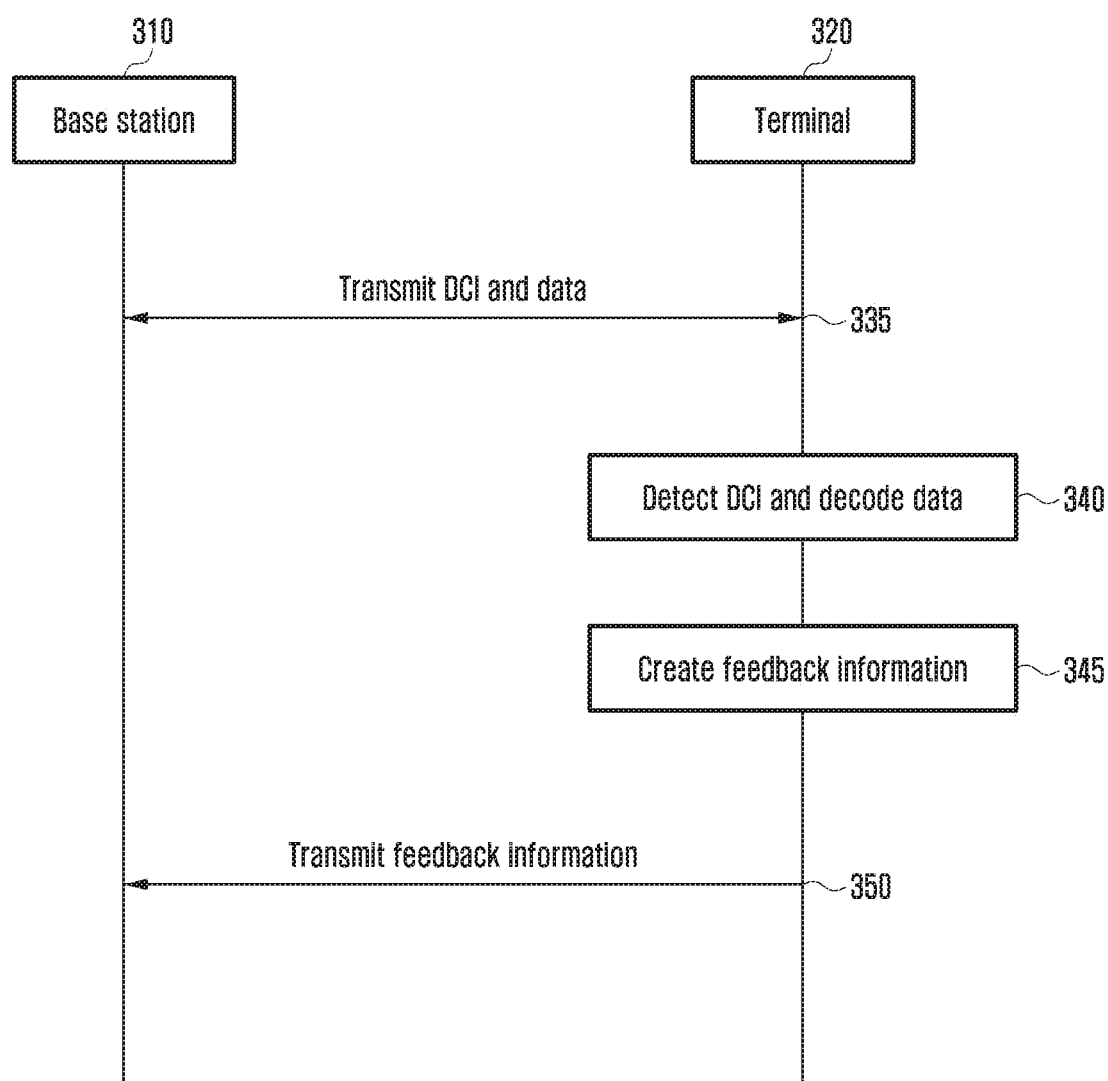
FIG. 3 is a diagram illustrating a feedback procedure between a base station and a terminal according to an embodiment of the present disclosure.

FIG. 3 is a diagram illustrating a feedback procedure between a base station and a terminal according to an embodiment of the present disclosure.

Referring to FIG. 3, a base station 310 indicates a resource for feedback to a terminal 320 by using DCI, and the terminal 320 transmits feedback by using feedback information received through the DCI.

At operation 335, the base station 310 may send the DCI and data to the terminal 320. The DCI may be transmitted through the xPDCCH of the subframe, and the data may be transmitted through the xPDSCH region of the same subframe. The DCI may include information for data reception and decoding, information about resources (time resources and/or frequency resources) for HARQ feedback transmission, and (BMI).

At operation 340, the terminal 320 detects a subframe and detects whether there is a DCI for the terminal 320 in the corresponding subframe. When the DCI for the terminal 320 is detected, data decoding may be performed based on scheduling information of the DCI. Also, HARQ feedback resource information and BMI included in the DCI may be identified.

At operation 345, the terminal 320 may create feedback information. The feedback information may be information indicating whether the data is decoded or not. If the decoding is successful, an ACK indicating a decoding success may be transmitted. If the decoding is unsuccessful, a NACK indicating a decoding failure may be transmitted. When transmitting with 1-bit information, 1 may indicate the ACK and 0 may indicate the NACK. In an embodiment, the feedback information may be bitmap information. The terminal 320 creates a new bitmap or calls a previously created bitmap and then enters the feedback information for corresponding data to a location corresponding to the BMI obtained through the DCI with regard to the created or called bitmap.

In an embodiment, ACK/NACK information for data received in a plurality of subframes may be multiplexed in one bitmap message.

At operation 350, the terminal 320 transmits the created feedback information to the base station 310. The resource to transmit feedback may utilize resources for HARQ feedback indicated through the DCI. The terminal 320 may transmit the created feedback information by using the time and frequency resources of subframe indicated as the HARQ feedback resource.

As discussed above, the HARQ feedback may be performed using the HARQ feedback information received through the DCI in the dynamic TDD system. In addition, when the DCIs of different subframes indicate the same xPUCCH resource as the feedback resource, the feedback information about data received from a plurality of subframes may be multiplexed and reported in the indicated xPUCCH resource. A plurality of pieces of feedback information may be multiplexed in the bitmap message.

Figure 4:
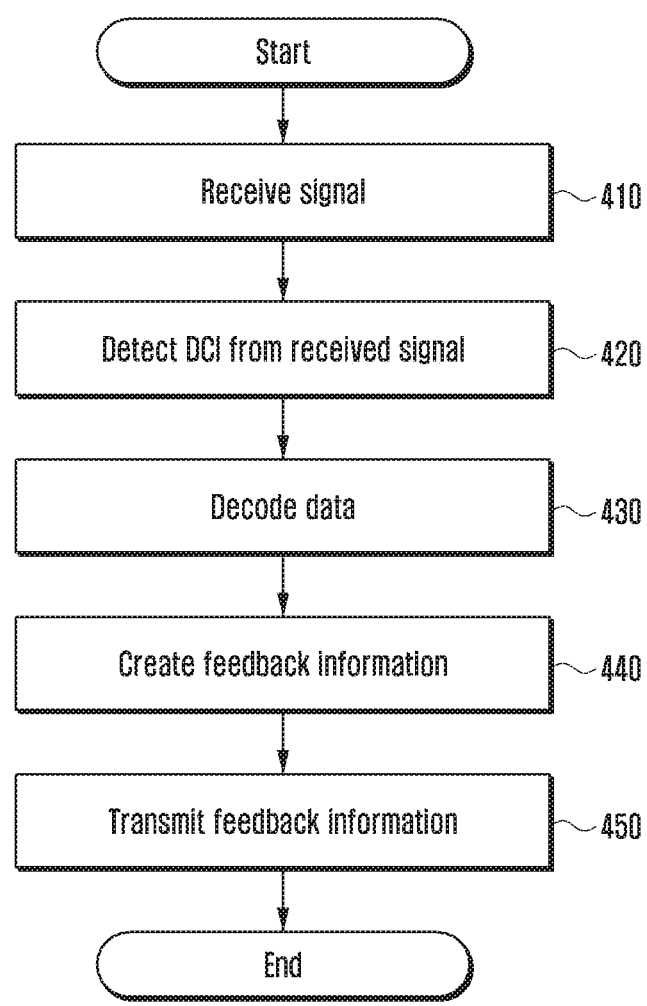
FIG. 4 is a diagram illustrating operations of a terminal according to an embodiment of the present disclosure.

FIG. 4 is a diagram illustrating operations of a terminal according to an embodiment of the present disclosure.

Referring to FIG. 4, at operation 410, the terminal may receive a signal. The signal received by the terminal may be a signal for a subframe including DCI and data transmitted by the base station. Namely, the terminal may receive a subframe, and the subframe may contain DCI and data.

At operation 420, the terminal detects the DCI from the received signal. Namely, the terminal may detect the DCI from the received subframe. The terminal detects the DCI by using predetermined information, and checks whether the DCI for the terminal is included. If the DCI for the terminal is not detected, the corresponding subframe is not decoded. The terminal may attempt the DCI detection for every subframe of the received signal. For example, the terminal may attempt the DCI detection in the xPDCCH region of the subframe.

Once the DCI is detected, information about the corresponding subframe may be obtained from the DCI. This information about the corresponding subframe may include information for data reception and decoding, information about resources (time resources and/or frequency resources) for HARQ feedback transmission, and bitmap index information.

If the corresponding subframe is a downlink subframe including the xPDSCH, at operation 430 the terminal may perform decoding for the downlink subframe, based on the information for data reception and decoding in the DCI.

At operation 440, the terminal may create feedback information. The terminal may identify the transmission resource information and the BMI for the HARQ feedback from the DCI. The feedback information may be created corresponding to a subframe in which the feedback information is transmitted. The terminal creates a bitmap of a predetermined size, and updates a decoding result at a specific location of the created bitmap. The specific location may be indicated according to the BMI obtained from the DCI. The BMI is information indicating a location to which the data decoding result of the corresponding subframe should be mapped in the bitmap. If the decoding is successful, the ACK indicating the decoding success is mapped, and if the decoding fails, the NACK indicating the decoding failure may be mapped. When transmitting with 1-bit information, 1 may indicate the ACK and 0 may indicate the NACK. Once the bitmap update is completed, the bitmap creation procedure may be terminated. If the DCI received in any other subframe indicates the same HARQ transmission resource, the terminal may multiplex the feedback information of the other subframe in the bitmap. The terminal may update the created bitmap, based on the BMI included in the DCI of the other subframe.

At operation 450, the terminal transmits the created feedback information to the base station. The HARQ feedback information may be transmitted via the xPUCCH. The xPUCCH resource for transmitting the HARQ feedback information is obtained from the DCI detected by the terminal. The terminal may transmit the feedback information to the base station by using time resources and frequency resources to transmit the xPUCCH.

Meanwhile, in an embodiment, the time of checking the bitmap message and the time of performing the data decoding are mutually exchangeable. Namely, not only may the bitmap message be checked after the data decoding and bit information of the bitmap may be updated, but also the data may be decoded and the decoding result may be updated to the checked bitmap. Checking the bitmap message may be used in combination with calling the bitmap message. If the bitmap message is not created in the corresponding subframe, the terminal updates the feedback information after initializing the corresponding bitmap message. If the bitmap message is created in the corresponding subframe, the terminal retrieves the created bitmap message and updates new feedback information.

Figure 5:
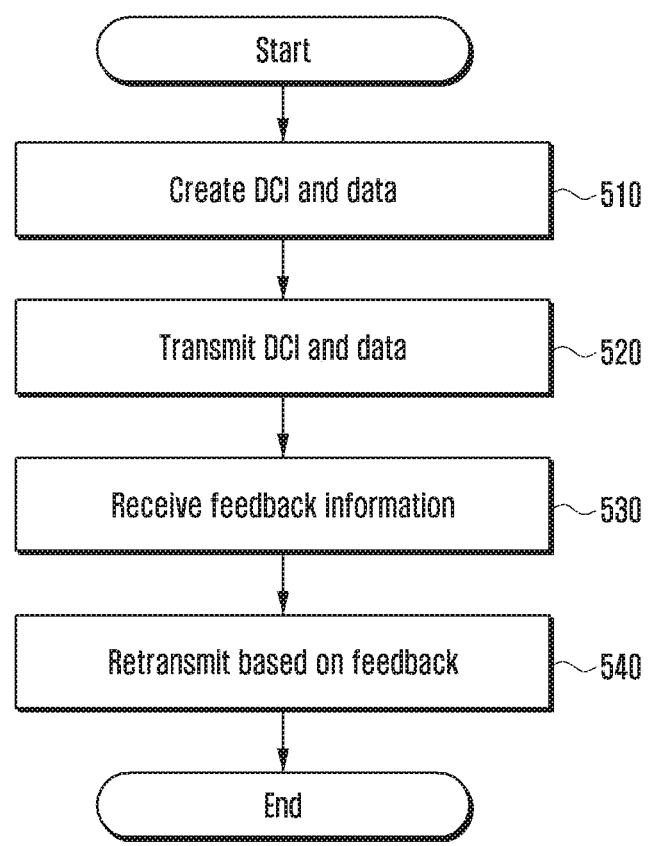
FIG. 5 is a diagram illustrating operations of a base station according to an embodiment of the present disclosure.

FIG. 5 is a diagram illustrating operations of a base station according to an embodiment of the present disclosure.

Referring to FIG. 5, at operation 510, the base station may create DCI and data to be transmitted to the terminal. The DCI may be transmitted through the xPDCCH, and the data may be transmitted through the xPDSCH of the same subframe. As mentioned above, the DCI may include information for data reception and decoding, information about resources for HARQ feedback, and bitmap index information. In an embodiment, in order to support the dynamic TDD and provide a feedback method of the terminal in the dynamic TDD, the base station may provide the information about resources for HARQ feedback and the BMI through the DCI. When the base station allocates the xPDSCH resource for the terminal, the resource information for HARQ feedback corresponding to the allocated xPDSCH may also be created and included in the same DCI.

At operation 520, the base station may transmit a subframe including the DCI and data to the terminal The DCI may be mapped to and transmitted in the xPDCCH region of the subframe, and the data may be mapped to and transmitted in the xPDSCH region.

At operation 530, the base station may receive feedback information. The base station may receive the feedback information in the xPUCCH resource region indicated to the terminal through the DCI. The feedback information may include a data decoding result of the terminal. The terminal that detects the DCI transmitted by the base station may identify the information about the time resource and the frequency resource of the xPUCCH for transmitting feedback from the detected DCI and identify the bitmap index information. Based on the information obtained from the DCI, the terminal creates the feedback information and may transmit the feedback information through the xPUCCH area instructed by the base station.

At operation 540, the base station may determine retransmission, based on the received feedback information. If the terminal successfully decodes the information, the base station does not retransmit the corresponding data. If the terminal fails to decode the corresponding data, the base station may retransmit the data that failed decoding. On the other hand, even if the decoding fails, the retransmission operation may be omitted if the information is not required to be retransmitted. The feedback information may include a plurality of pieces of feedback information for data transmitted in a plurality of subframes. When a plurality of pieces of feedback information are multiplexed, the base station may identify each bit of the bitmap and check whether the terminal has successfully decoded the corresponding data. The base station may retransmit data transmitted in a subframe, in which the terminal fails to decode, among a plurality of subframes.

Now, a method for configuring the feedback resource will be described in detail.

In an embodiment of the present disclosure, the transmission time information of the xPUCCH may be delivered to the terminal in the following manner. The DCI delivered by the base station may include information about offset. The offset information may be referred to as k_offset. For example, the k_offset may be 3-bit information and selected as one value from {0, 1, 2, . . . , 7} to be transmitted to the terminal. In case of containing the k_offset in the DCI transmitted in the n-th subframe, the subframe index I, which is the time at which the xPUCCH is transmitted, may be determined according to equation 1 as follows.

$$I = n + k\_offset \qquad \text{Equation 1}$$

Meanwhile, a default offset may be configured prior to receiving the DCI. The default offset may be referred to as k_default. In case of containing the k_offset in the DCI transmitted in the n-th subframe, the subframe index I at which the xPUCCH is transmitted may be determined according to equation 2.

$$I = n + k\_default + k\_offset \qquad \text{Equation 2}$$

The k_default value may already be configured in the terminal. That is, the k_default value may be a fixed value defined in the standard, and may be configured from the base station or the upper level. When the k_default is 0, equations 1 and 2 are the same.

The k value may be delivered through the DCI. In this case, the subframe in which the xPUCCH is transmitted may be determined as shown in equation 3.

$$I = n + k\_default + K\_offset(k) \qquad \text{Equation 3}$$

At this time, the K_offset set may use a fixed set defined in the standard. For example, a set such as K_offset={0, 2, 4, 8} may be used.

The K_offset set may be defined as K_offset={0, K_step, 2K_step, 3K_step, . . . }. At this time, the initial value of K_step may be a fixed value defined in the standard, and may be configured in the terminal from the base station afterwards. When the K_step value is configured in the terminal from the base station, a different K_step value may be configured for each terminal through, for example, a radio resource control (RRC) message.

In the above-described time resource configuration, it is assumed that one xPUCCH transmission time is defined in one subframe index. However, the above is also applicable to a case where more than one xPUCCH transmission time is defined in one subframe index.

For example, if T xPUCCH transmission times are defined in one subframe index, the subframe index I may be determined as shown in equation 4. K_offset and k_default refer to the above description.

$$I = n + k\_default + \text{floor}(k\_offset/T) \qquad \text{Equation 4}$$

Among the T xPUCCH transmission times defined in the subframe index I, the transmission time of the xPUCCH indicated through the DCI may be determined as k_offset mod T.

The DCI may include additional indication information as to which xPUCCH transmission time among the plurality of xPUCCH transmission times will be used in the subframe I.

Based on the time and/or frequency resource allocation information of the xPDSCH scheduled by the DCI, the transmission time of the xPUCCH corresponding to the scheduled xPDSCH among the plurality of xPUCCH transmission times may be determined.

In each of the above various embodiments, the k_default value may be determined in the following manner.

A value fixed in the standard may be used as the k_default value.

At the initial access, the terminal may use the fixed value defined in the standard as the k_default value. Thereafter, a new k_default value is determined between the base station and the terminal, and the determined k_default value may be used. For example, the base station and the terminal may change the k_default value by using an RRC message.

In an embodiment, the frequency resource information of the xPUCCH may be delivered to the terminal in the following manner. The DCI delivered by the base station may include information indicating frequency resources. For example, an index i indicating the frequency resource may be included.

The terminal may use, for xPUCCH transmission, the frequency resource corresponding to the index i included in the DCI among all the frequency resources of the xPUCCH defined by a total of N_xPUCCH indexes. For example, the frequency resource of xPUCCH may be composed of n frequency resource groups. For example, the unknown n may be 16. One frequency resource group may be composed of six resource blocks (RBs), and one RB may be composed of twelve subcarriers. The unknown n, the number of RBs, and the number of subcarriers are not limited to the above example. In an embodiment, the index i may be 4-bit information and may indicate one value of {0, 1, 2, . . . n−1}.

Alternatively, a part of all the frequency resources of the xPUCCH defined by N_xPUCCH indexes may be designated as an i_xPUCCH set, and this may be configured in advance in the terminal by the base station. For example, the base station may configure an i_xPUCCH set by using an RRC message. The terminal may use, for xPUCCH transmission, the frequency resource corresponding to the i_xPUCCH(i) index, based on the i value received through the DCI. For example, when divided into 4 groups for 16 frequency resources, each group may be divided into four frequency regions for i_xPUCCH. In this case, the group corresponding to the terminal among the four groups may be indicated in advance for each terminal through, for example, the RRC message. Therefore, in order to indicate one of the four frequency regions in the group, information to be indicated through the i of the DCI is sufficient as 2-bit information. In this case, it may be advantageous to reduce the size of the DCI.

At this time, the terminal may need an initial value of the i_xPUCCH set which may be used before the RRC configuration is completed. The initial value of the i_xPUCCH set may be configured as follows. The base station may configure a cell-specific i_xPUCCH value and broadcast it to UEs in the cell through transmission of system information block (SIB). It is also possible to provide an RA_RNTI-specific or C-RNTI-specific i_xPUCCH configuration method in the standard.

In this manner, the terminal may obtain the time resource and frequency resource of the xPUCCH resources for transmitting feedback. Namely, the terminal may determine a specific subframe among a plurality of subframes by using time resource information of the DCI, and may determine a specific frequency resource among a plurality of frequency resources of the subframe by using frequency resource information of the DCI. HARQ feedback information may be transmitted in a specific frequency resource of the determined subframe. The transmitted HARQ feedback information may be bitmap information.

Next, a method for creating a bitmap by the terminal will be described. The method for delivering the time resource and frequency resource for feedback to the terminal by the base station and the method for obtaining them by the terminal are described above. The terminal may create feedback information by using information received through the DCI. In an embodiment, the feedback information may be the bitmap information.

The terminal may create a bitmap message ($a_0, a_1, \ldots, a_{B-1}$) composed of B bits and transmit this by using a determined frequency resource of a determined subframe. In this case, the B value may be configured in the terminal by the base station through the RRC. The base station may configure the B value unique to the terminal according to a radio environment of the terminal or may configure the same B value to all UEs according to the determination of a base station scheduler. Before the RRC configuration is completed, the initial value of B may use a fixed value defined in the standard. The fixed value defined in the standard may be, for example, 4 bits. For example, bitmap sizes of 6 bits and 8 bits may be configured through RRC signaling.

FIG. 6 is a diagram illustrating a bitmap according to an embodiment of the present disclosure. For example, as shown in FIG. 6, the bitmap may be composed of 4 bits, 6 bits, and 8 bits. The number of bits of the bitmap is not to be construed as a limitation.

Referring to FIG. 6, one bitmap message may be created for one subframe, and a plurality of bitmap messages may be created for one subframe.

First, a case where one bitmap message is created for one subframe will be described. The bitmap message may be defined as a separate bitmap message for the subframe index I indicating the xPUCCH transmission time. Namely, only one bitmap message is defined for one subframe index I. This means that the xPUCCH transmission is possible for only one frequency resource for one subframe index I. If the terminal is instructed on subframe I as a subframe for the xPUCCH through the DCI received in the n-th subframe, and if the subframe I is not the previously instructed subframe, the terminal creates a new bitmap of B bits. The terminal initializes all the bits of the created bitmap by NACK. When using the 4-bit bitmap message of FIG. 6, the initial value may be configured to '0000'.

On the other hand, when creating the bitmap, the initialization process may be omitted. The terminal may create a bitmap message that reflects the size of the bitmap, the location of a bit indicating whether to decode data in the bitmap, and a decoding result of the data.

Next, a case where a plurality of bitmap messages are created for one subframe will be described. The bitmap message may be defined as a separate bitmap message for the subframe index I indicating the xPUCCH transmission time and the frequency resource index i. Namely, a plurality of bitmap messages are defined for one subframe index I, and this means that it is possible to transmit multiple xPUCCHs for different frequency resources for one subframe index I. If a new subframe index I' or xPUCCH frequency resource index i', which has not been previously instructed in the DCI received by the terminal in the n'-th subframe, is indicated as the xPUCCH transmission resource, the terminal creates a new bitmap message of B bits. The terminal may initialize all the bits of the created bitmap by NACK. When using the 6-bit bitmap in FIG. 6, the initial value may be configured to '000000'.

The terminal may update the created bitmap, based on a BMI value b indicated in the DCI. When using the B-bit bitmap message, $b \in \{0, \ldots, B-1\}$. Based on the BMI value, the terminal may update the feedback information for data received in the n-th subframe to the $a_b$ bit. If the terminal succeeds in decoding data (DL data, xPDSCH) scheduled from the DCI, the terminal updates the bit $a_b$ to ACK. If decoding fails, no further update is required since the bit is already initialized to NACK. A bit value may be configured as 1 for ACK and 0 for NACK.

For example, when a 4-bit bitmap is used in FIG. 6, the values $a_0, a_1, a_2$, and $a_3$ may be initialized to zero. The BMI value 0 may correspond to the bitmap location $a_0$, the BMI value 1 may correspond to the bitmap location $a_1$, the BMI value 2 may correspond to the bitmap location $a_2$, and the BMI value 3 may correspond to the bitmap location $a_3$. In case of using a 6-bit or 8-bit bitmap, the BMI value and the location of the bitmap may correspond to each other in the same manner.

The terminal may receive 0 as the BMI value through the DCI of subframe n. In this case, the terminal updates the feedback information for data scheduled in the subframe n to the $a_0$ bit of the bitmap message. The terminal may configure the $a_0$ bit as 0 or 1, depending on the success or failure of data decoding in subframe n. It may be configured as 1 in case of successful decoding, or as 0 in case of failed decoding. Upon successful decoding, the entire bitmap message becomes 1000, and the terminal may transmit the bitmap message through the determined time resource and frequency resource. Upon failed decoding, the entire bitmap message becomes 0000, and the terminal may transmit the bitmap message through the determined time resource and frequency resource.

The terminal may form, as one bitmap, feedback information for downlink data received in a plurality of subframes and transmit it through the xPUCCH. The DCI received in the n-th subframe by the terminal may indicate the subframe index I as the xPUCCH transmission time and the index i as the xPUCCH frequency resource, and the DCI received in the m-th subframe by the terminal may indicate the subframe index I as the xPUCCH transmission time and the index i as the xPUCCH frequency resource. The terminal may call the bitmap message corresponding to the xPUCCH transmission time and frequency resource or create a new bitmap message and update two pieces of feedback information at the location corresponding to the BMI value indicated by each DCI.

For example, it is assumed that the 4-bit bitmap message of FIG. 6 is used. It is also assumed that both the DCI of the n-th subframe and the DCI of the m-th subframe indicate a subframe index I as the time resource and an index i as the frequency resource. In this case, the BMI values indicated through the DCI should be different values. The DCI received in the n-th subframe may indicate 0 as the BMI value, and the DCI received in the m-th subframe may indicate 2 as the BMI value. The terminal may update the $a_0$ bit of the bitmap message according to the data decoding result of the n-th subframe and update the $a_2$ bit of the bitmap message according to the data decoding result of the m-th subframe. Depending on the decoding result, the bit value may be determined as 0 or 1. If the data decoding of the n-th sub-frame and the m-th sub-frame is successful, the bitmap may be updated to 1010. The terminal may determine whether there is a bit to be additionally updated in the I-th subframe, perform an update operation when there is a bit to be updated, and transmit the created bitmap message 1010 through the determined time resource (the subframe index I) and the determined frequency resource (the frequency index i) when there is no bit to be updated.

If a separate bitmap message is defined for the subframe index, and if DCIs of different subframes indicate the same subframe index as the xPUCCH transmission time, the frequency resource index i included in the DCIs of the different subframes is configured to have the same value. In this case, the corresponding BMI values should be different from each other. The BMI value indicated through the DCI should satisfy $b \in \{0, \ldots, B-1\}$. If the b value identified in the DCI by the terminal is greater than B−1, the terminal may discard all information obtained from the corresponding DCI and may not perform a series of related operations. Since identifying, as the b value, a value greater than B−1 by the terminal may be regarded as an error, related operations may not be performed.

Next, detailed operations of the present disclosure will be described using examples.

Figure 7:
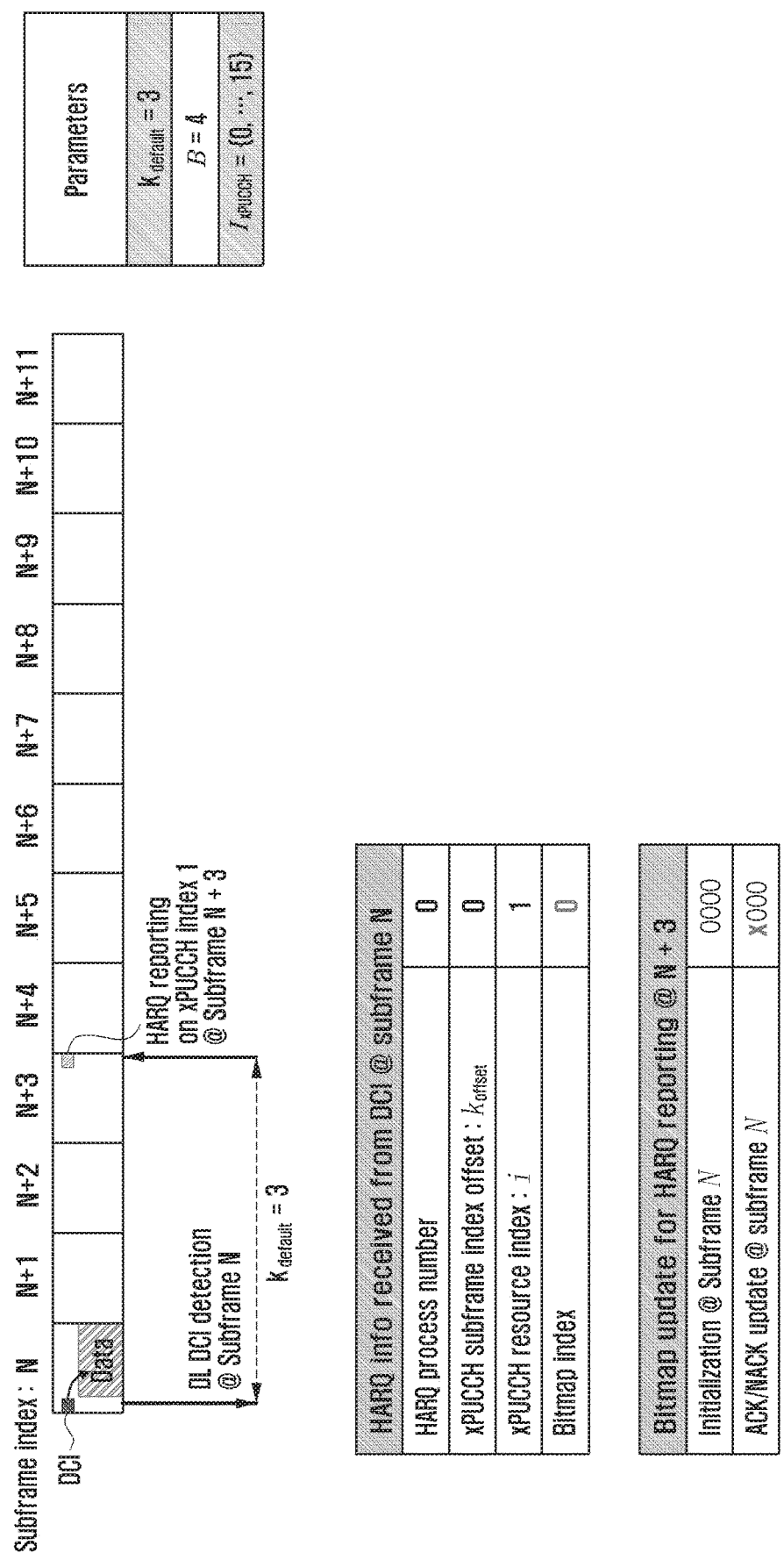
FIG. 7 is a diagram illustrating a method for creating a bitmap according to an embodiment of the present disclosure.

FIG. 7 is a diagram illustrating a method for creating a bitmap according to an embodiment of the present disclosure.

Referring to FIG. 7, data is scheduled in the N-th subframe, based on the DCI received in the N-th subframe, and the result of decoding the data is fed back using the xPUCCH resource in the (N+3)-th subframe. In this embodiment of FIG. 7, it is assumed that parameters are as follows: k_default=3, B=4, and i_xPUCCH={0, 1, . . . , 15}. Each parameter value may be predetermined and may be configured by higher signaling. In this embodiment of FIG. 7, it is assumed that parameter values k_default, B, and i_xPUCCH are configured through RRC in an upper layer. In this embodiment of FIG. 7, it is assumed that HARQ related information received via the DCI is k_offset=0, i=1, and BMI=0. The HARQ process number is zero. The HARQ process number is identification information for identifying the HARQ process.

Since k_offset=0 as a time resource for the xPUCCH in the DCI received in the subframe n=N, and since the subframe index for xPUCCH transmission is determined as I=n+k_default+0, the subframe index for xPUCCH transmission may be determined as I=n+3. Also, since the frequency resource index of the xPUCCH is indicated as i=1 in the DCI received in the subframe N, the HARQ feedback is performed using the frequency resource of the xPUCCH corresponding to the index i=1 in the subframe index N+3.

Since the B value indicating the bitmap size is 4, the terminal may create a 4-bit bitmap message. The terminal may create the bitmap message as information to be transmitted in the (N+3)-th subframe. The terminal may initialize all the bits of the bitmap to an initial value of 0 corresponding to NACK. As the initialization result, the bitmap message of 0000 may be created. Since the BMI value indicated by the DCI received in the N-th subframe is 0, the terminal updates, in the first bit of the 4-bit bitmap message, the decoding result x of data received in the N-th subframe. As the update result, the bitmap message of x000 may be created. If decoding is successful, the first bit of the bitmap is updated to 1 (the bitmap message 1000), and if decoding fails, the bit is configured as 0 (the bitmap message 0000).

Figure 8:
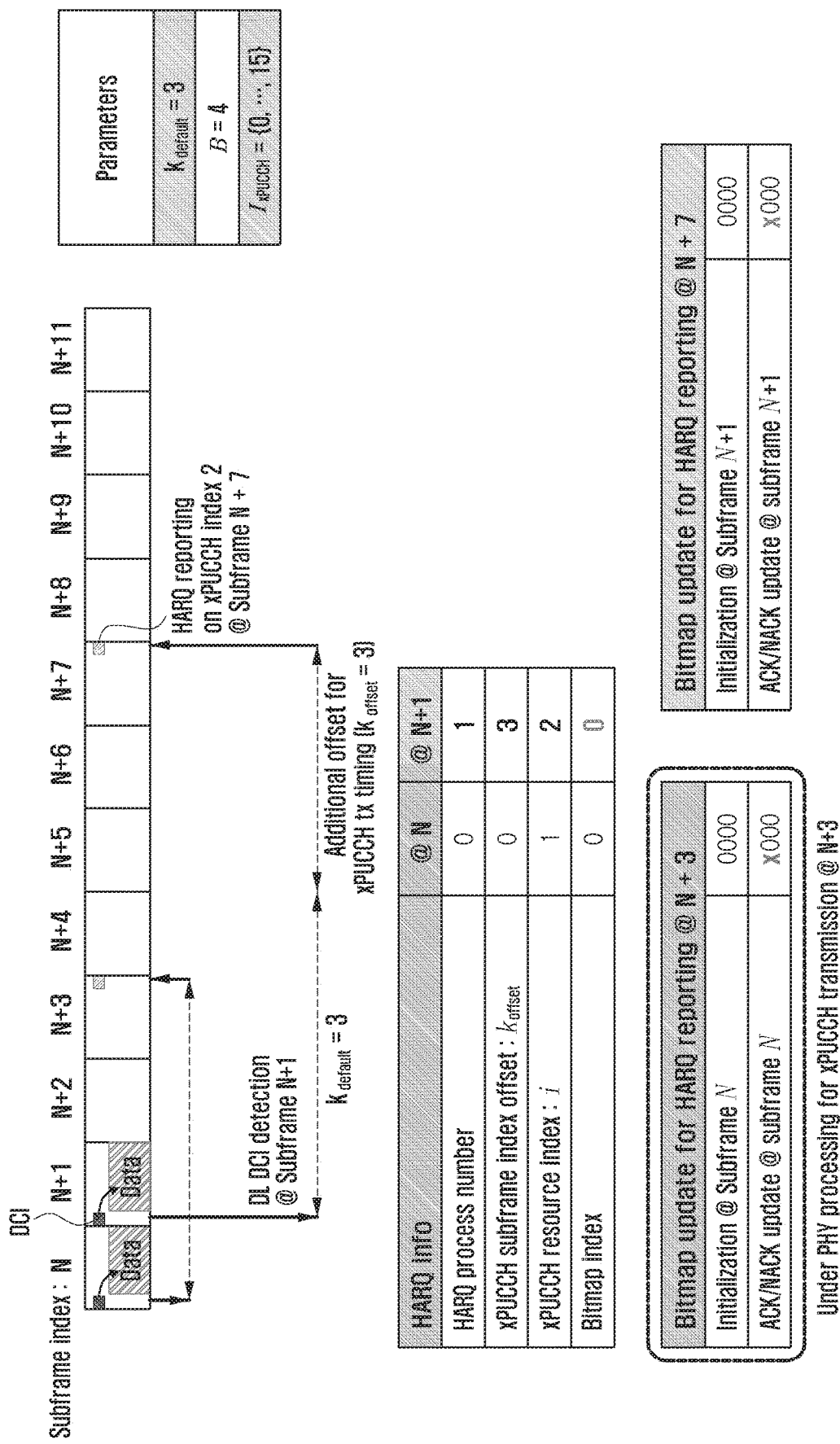
FIG. 8 is a diagram illustrating a method for creating a bitmap according to another embodiment of the present disclosure.

FIG. 8 is a diagram illustrating a method for creating a bitmap according to another embodiment of the present disclosure.

Referring to FIG. 8, it is assumed that the bitmap message for the N-th subframe is created under the conditions described in FIG. 7. Meanwhile, in the (N+1)-th subframe, data is scheduled through the DCI, and an xPUCCH resource is indicated. Since the k_default value is configured as 3 in an embodiment, it is not possible to indicate, in the (N+1)-th subframe, the update of the bitmap message to be transmitted through the xPUCCH or a request for new xPUCCH transmission for the (N+3)-th subframe. Therefore, the feedback information for the subframe after the N-th subframe may not be multiplexed in the (N+3)-th subframe. Therefore, the terminal may start processing for transmitting the xPUCCH in the (N+3)-th subframe after the N-th subframe.

Next, a feedback method for the DCI in the subframe n=N+1 will be described in detail. Referring to FIG. 8, data is scheduled in the DCI received in the (N+1)-th subframe and the feedback is requested to be transmitted in the (N+7)-th subframe. In this embodiment of FIG. 8, it is assumed that parameters are as follows: k_default=3, B=4, and i_xPUCCH={0, 1, . . . , 15}. In this embodiment of FIG. 8, it is assumed that HARQ related information received through the DCI in the (N+1)-th subframe is k_offset=3, i=2, and BMI=0. The HARQ process number is 1.

Since k_offset=3 as the time resource for the xPUCCH in the DCI received in the subframe n=N+1, the subframe index for the xPUCCH transmission is determined as I=n+k_default+3 and thus I=n+3+3. Since the DCI received in the subframe N+1 indicates i=2 as the frequency resource index of the xPUCCH, the HARQ feedback is performed using the frequency resource of the xPUCCH corresponding to the index i=2 in the subframe index N+7.

Since the B value indicating the bitmap size is 4, the terminal may create a 4-bit bitmap message. The terminal may create the bitmap message as information to be transmitted in the (N+7)-th subframe. The terminal may initialize all the bits of the bitmap to an initial value of 0 corresponding to NACK. As the initialization result, the bitmap message of 0000 may be created. Since the BMI value indicated by the DCI received in the (N+1)-th subframe is 0, the terminal updates, in the first bit of the 4-bit bitmap message, the decoding result x of data received in the (N+1)-th subframe. As the update result, the bitmap message of x000 may be created. If decoding is successful, the first bit of the bitmap is updated to 1 (the bitmap message 1000), and if decoding fails, the bit is configured as 0 (the bitmap message 0000).

Figure 9:
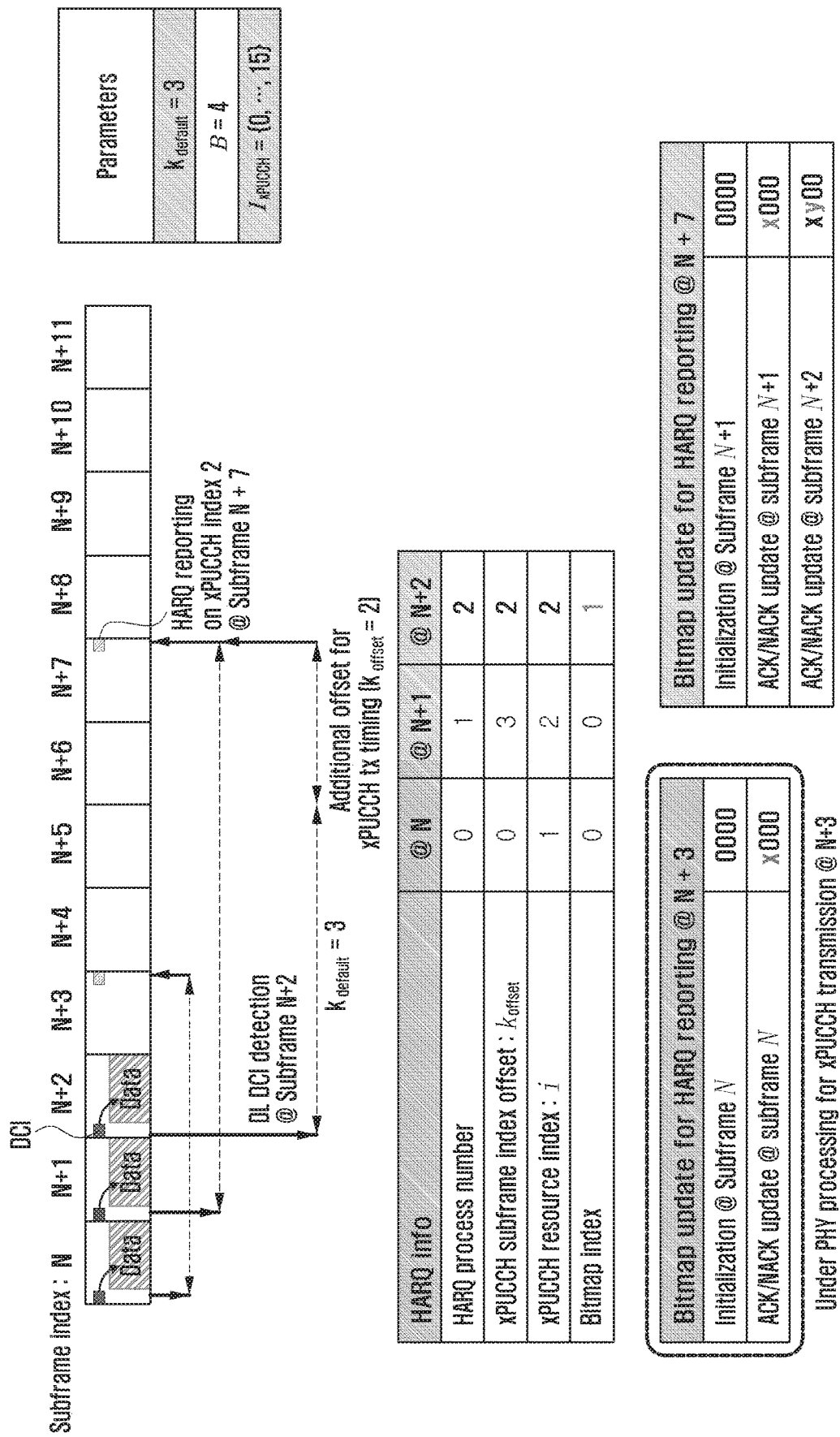
FIG. 9 is a diagram illustrating a method for creating a bitmap according to still another embodiment of the present disclosure.

FIG. 9 is a diagram illustrating a method for creating a bitmap according to still another embodiment of the present disclosure.

In FIG. 9, it is assumed that the conditions for the subframe N and the subframe N+1 are the same as the conditions described in FIGS. 7 and 8.

Referring to FIG. 9, the DCI received in the (N+2)-th subframe performs scheduling for data and requests the HARQ feedback to be transmitted in the (N+7)-th subframe. In this embodiment of FIG. 9, it is assumed that parameters are as follows: k_default=3, B=4, and i_xPUCCH={0, 1, . . . , 15}. In this embodiment of FIG. 9, it is assumed that HARQ related information received through the DCI in the (N+2)-th subframe is k_offset=2, i=2, and BMI=1. The HARQ process number is 2.

Since k_offset=2 as the time resource for the xPUCCH in the DCI received in the subframe n=N+2, the subframe index for the xPUCCH transmission is determined as I=n+k_default+2 and thus I=n+3+2. Since the DCI received in the subframe N+2 indicates i=2 as the frequency resource index of the xPUCCH, the HARQ feedback is performed using the frequency resources of the xPUCCH corresponding to the index i=2 in the subframe index N+7.

The terminal identifies the bitmap created in the (N+1)-th subframe because the time resource and the frequency resource of the xPUCCH to transmit the feedback for data of the (N+1)-th subframe and the (N+2)-th subframe are the same. The state in which the bitmap is identified may be x000. At this time, the unknown x is the decoding result of the (N+1)-th subframe. The terminal may update the feedback information y at the bit location corresponding to the BMI value 1 indicated by the DCI received in the (N+2)-th subframe. The terminal may update, using y, the HARQ ACK/NACK information as a decoding result for data of the (N+2)-th subframe. It may be updated to 1 when decoding is successful and to 0 when decoding is unsuccessful. As the update result, the bitmap message of the (N+7)-th subframe may be xy00. In this manner, when the time resource and the frequency resource of the xPUCCH indicated through the DCI of different subframes are the same, the feedback information for a plurality of subframes may be multiplexed and transmitted.

Figure 10:
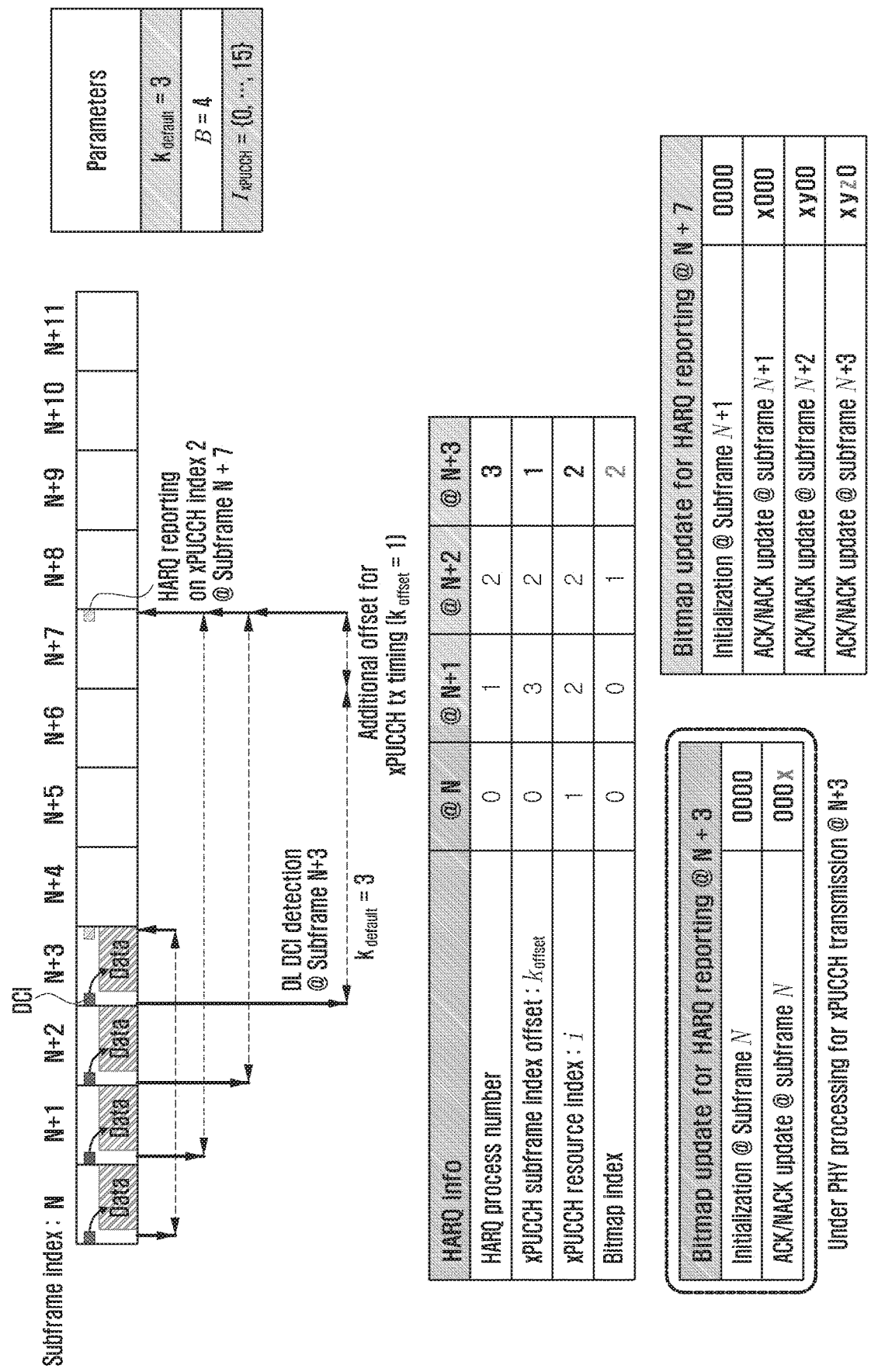
FIG. 10 is a diagram illustrating a method for creating a bitmap according to yet another embodiment of the present disclosure.

FIG. 10 is a diagram illustrating a method for creating a bitmap according to yet another embodiment of the present disclosure.

In FIG. 10, it is assumed that conditions for the subframe N, the subframe N+1, and the subframe N+2 are the same as the conditions described in FIGS. 7, 8, and 9.

Referring to FIG. 10, the DCI received in the (N+3)-th subframe performs scheduling for data and requests the HARQ feedback to be transmitted in the (N+7)-th subframe. In this embodiment of FIG. 10, it is assumed that parameters are as follows: k_default=3, B=4, and i_xPUCCH={0, 1, . . . , 15}. In this embodiment of FIG. 10, it is assumed that HARQ related information received through the DCI in the (N+2)-th subframe is k_offset=1, i=2, and BMI=1. The HARQ process number is 3.

Since k_offset=1 as the time resource for the xPUCCH in the DCI received in the subframe n=N+3, the subframe index for the xPUCCH transmission is determined as I=n+k_default+1 and thus I=n+3+1. Since the DCI received in the subframe N+3 indicates i=2 as the frequency resource index of the xPUCCH, the HARQ feedback is performed using the frequency resources of the xPUCCH corresponding to the index i=2 in the subframe index N+7.

The terminal identifies the bitmap updated in the (N+2)-th subframe because the time resource and the frequency resource of the xPUCCH to transmit the feedback for data of the (N+1)-th subframe, the (N+2)-th subframe, and the (N+3)-th subframe are the same. The state in which the bitmap is identified may be xy00. At this time, the unknown x is the decoding result of the (N+1)-th subframe, and the unknown y is the decoding result of the (N+2)-th subframe. The terminal may update the feedback information z at the bit location corresponding to the BMI value 2 indicated by the DCI received in the (N+3)-th subframe. The terminal may update, using z, the HARQ ACK/NACK information as a decoding result for data of the (N+3)-th subframe. It may be updated to 1 when decoding is successful and to 0 when decoding is unsuccessful. As the update result, the bitmap message of the (N+7)-th subframe may be xyz0.

Figure 11:
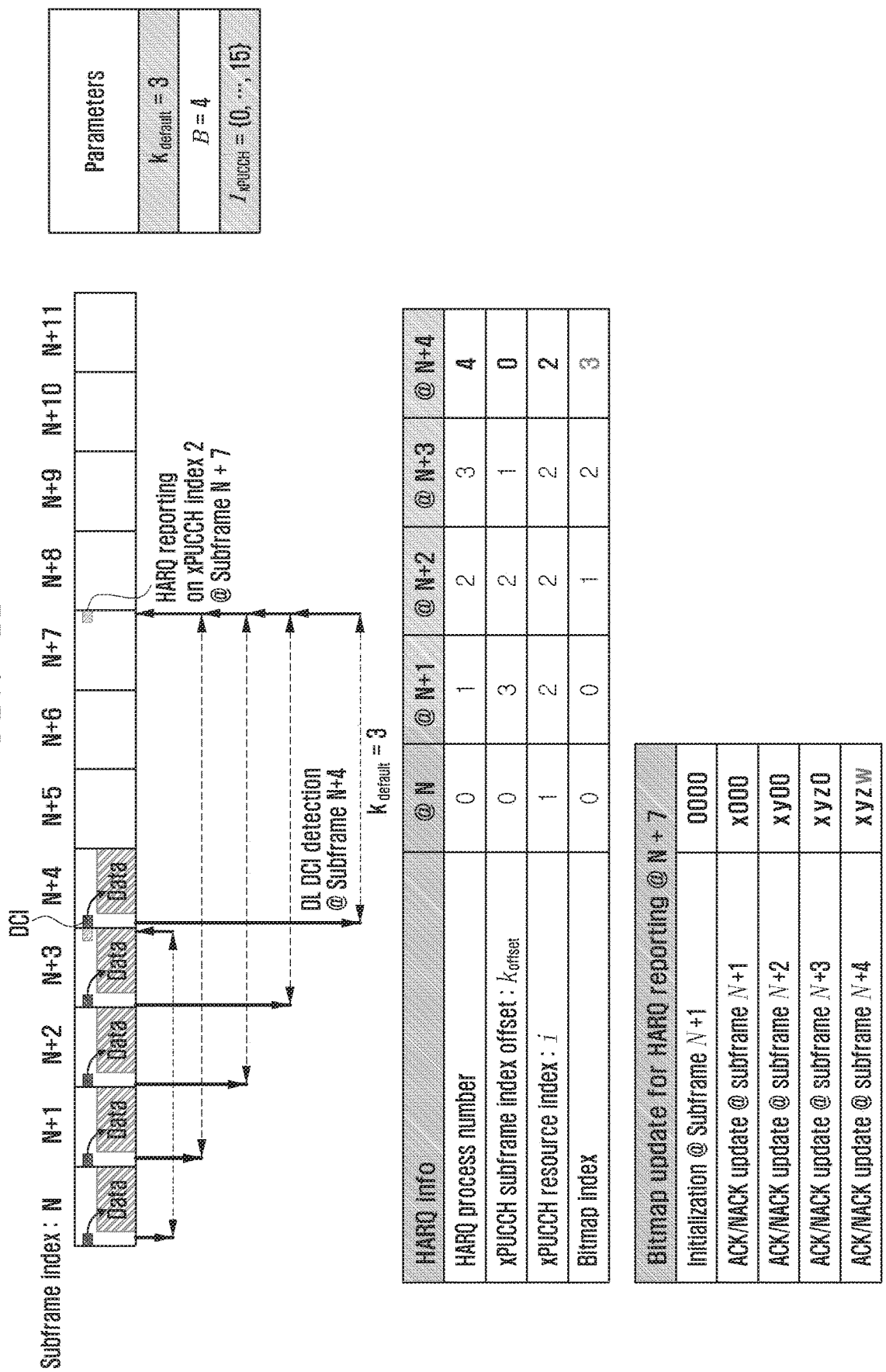
FIG. 11 is a diagram illustrating a method for creating a bitmap according to further another embodiment of the present disclosure.

FIG. 11 is a diagram illustrating a method for creating a bitmap according to further another embodiment of the present disclosure.

In FIG. 11, it is assumed that conditions for the subframe N, the subframe N+1, the subframe N+2, and the subframe N+3 are the same as the conditions described in FIGS. 7, 8, 9, and 10.

Referring to FIG. 11, the DCI received in the (N+4)-th subframe performs scheduling for data and requests HARQ feedback to be transmitted in the (N+7)-th subframe. In this embodiment of FIG. 11, it is assumed that parameters are as follows: k_default=3, B=4, and i_xPUCCH={0, 1, . . . , 15}. In this embodiment of FIG. 11, it is assumed that HARQ related information received through the DCI in the (N+3)-th subframe is k_offset=0, i=2, and BMI=1. The HARQ process number is 4.

Since k_offset=0 as the time resource for the xPUCCH in the DCI received in the subframe n=N+4, the subframe index for the xPUCCH transmission is determined as I=n+k_default+0 and thus I=n+3+0. Since the DCI received in the subframe N+4 indicates i=2 as the frequency resource index of the xPUCCH, the HARQ feedback is performed using the frequency resources of the xPUCCH corresponding to the index i=2 in the subframe index N+7.

The terminal identifies the bitmap updated in the (N+3)-th subframe because the time resource and the frequency resource of the xPUCCH to transmit the feedback for data of the (N+1)-th subframe, the (N+2)-th subframe, the (N+3)-th subframe, and the (N+4)-th subframe are the same. The state in which the bitmap is identified may be xyz0. At this time, the unknown x is the decoding result of the (N+1)-th subframe, the unknown y is the decoding result of the (N+2)-th subframe, and the unknown z is the decoding result of the (N+3)-th subframe. The terminal may update the feedback information w at the bit location corresponding to the BMI value 3 indicated by the DCI received in the (N+4)-th subframe. The terminal may update, using w, the HARQ ACK/NACK information as a decoding result for data of the (N+4)-th subframe. It may be updated to 1 when decoding is successful and to 0 when decoding is unsuccessful. As the update result, the bitmap message of the (N+7)-th subframe may be xyzw. As a result of the update, the bitmap message of the (N+7) th subframe may be xyzw. Since all bits of the bitmap message are updated and the k_default value is 3, the terminal may start processing for transmitting the xPUCCH in the (N+7)-th subframe after the (N+4)-th subframe.

Through various embodiments as shown in FIGS. 8 to 11, it is confirmed that the feedback information for data transmitted in a plurality of subframes is multiplexed in one bitmap message. In this manner, when information about a plurality of subframes is multiplexed in one bitmap, the xPUCCH resource information should indicate the same time and frequency resources and the BMI values should indicate different values.

If the terminal has not previously created the bitmap message for the subframe indicated as the transmission time of the xPUCCH by the detected DCI, the terminal newly creates a bitmap message corresponding to the predetermined B bit. If a bitmap message has already been created for the subframe indicated as the transmission time of the xPUCCH by the detected DCI, the terminal updates the bit information indicated by the BMI according to the decoding result.

Figure 12:
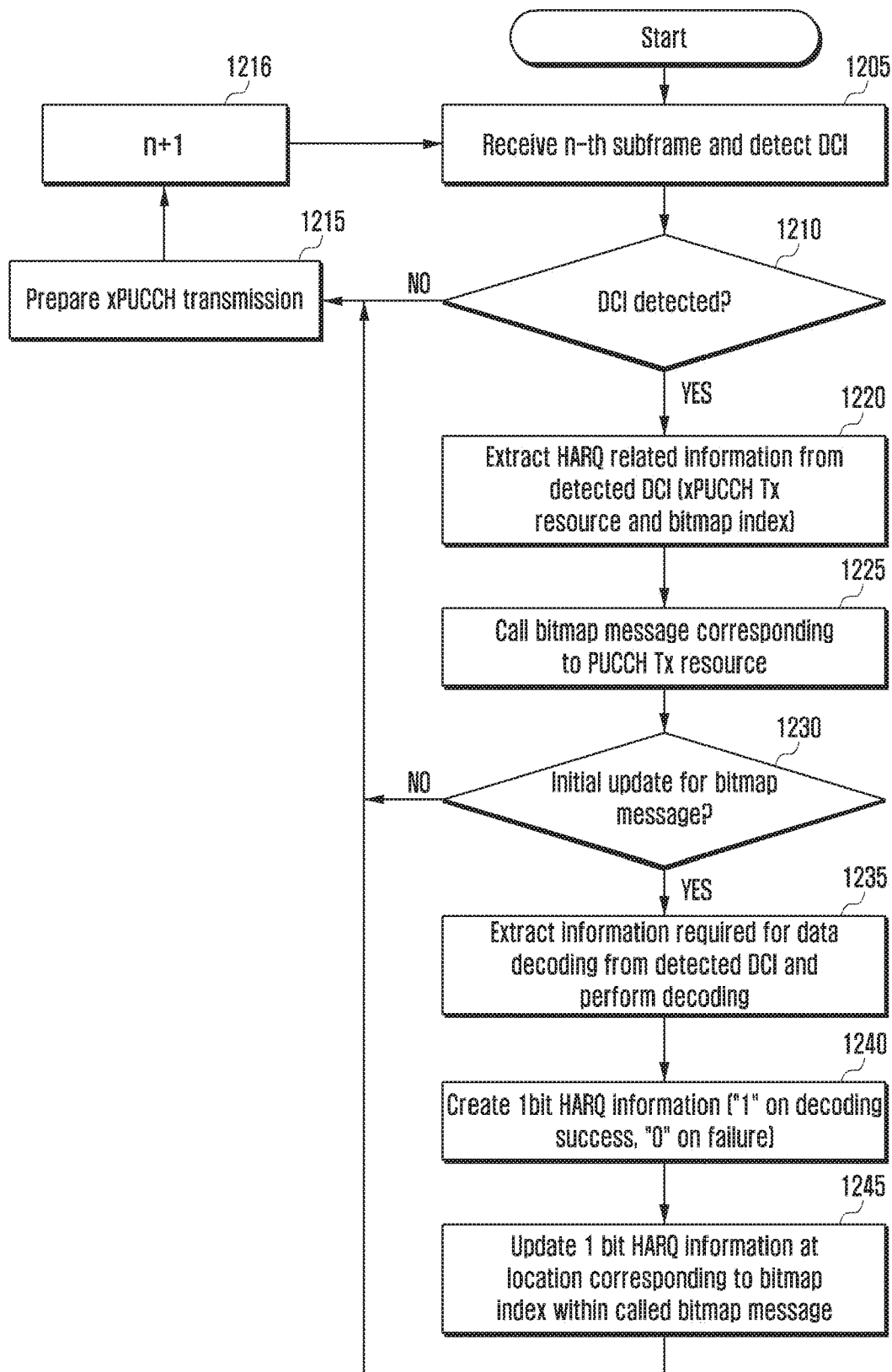
FIG. 12 is a diagram illustrating a feedback method of a terminal according to another embodiment of the present disclosure.

FIG. 12 is a diagram illustrating a feedback method of a terminal according to another embodiment of the present disclosure.

Referring to FIG. 12, at operation 1205, the terminal receives the n-th sub-frame. The terminal attempts DCI detection from the received subframe. In the subframe, the DCI for the terminal may exist or not.

If the DCI of the terminal is detected at operation 1210, operation 1220 is performed. If the DCI is not detected, operation 1215 is performed. If the DCI is not detected, the subframe is not decoded any more.

At operation 1220, the terminal may extract HARQ related information from the DCI. The HARQ related information may include time resource information and frequency resource information of xPUCCH for transmitting HARQ information, and bitmap index information. The time resource information may be the above-discussed k_offset, and the frequency resource information may be the above-discussed index i corresponding to a specific frequency region of the xPUCCH region. The BMI may be information indicating the location of a bit to which feedback information for data transmitted in the subframe n is mapped or updated. Methods for obtaining and configuring the HARQ information may be the same as described in the above various embodiments.

At operation 1225, the terminal may check a bitmap message corresponding to the detected xPUCCH transmission resource. If the bitmap message is not created for the xPUCCH transmission resource, a new bitmap message is created and initialized. If the bitmap message is created for the corresponding xPUCCH transmission resource, the created message is identified. The size of the bitmap message may be indicated with B bits. The B value may be a value determined according to the standard or a value configured from the base station.

At operation 1230, the terminal determines whether an update is the initial update for the bitmap index obtained through the DCI. If not the initial update, the update operation is interrupted and operation 1215 is performed again and n representing the subframe number is incremented by 1 in operation 1216. In case of the initial update for the bitmap index, operation 1235 is performed.

At operation 1235, the terminal extracts information required for data decoding from the DCI and performs decoding. The terminal may succeed in decoding data or fail to decode the data. Operation 1235 may change the order with operations 1220 to 1230. Namely, a process of performing the data decoding and a process of checking the bitmap may be interchanged.

At operation 1240, the terminal obtains a decoding result. The decoding result may be represented by 1-bit information, namely, "1" in case of successful decoding, and "0" in case of failed decoding.

At operation 1245, the terminal may update the decoding result to a location corresponding to the BMI in the identified bitmap message. If the decoding is successful, the bit of the location corresponding to the BMI may be updated to 1. The above processes may be repeatedly performed. As described in FIGS. 8 to 11, since the feedback information for data transmitted in a plurality of subframes within one bitmap message may be multiplexed, the above processes may be repeated. Also, if the above process is a feedback procedure for data transmitted in the n-th subframe, the above operations may be repeatedly performed for feedback on data transmitted in the (N+1)-th subframe even through it is not multiplexed in the same bitmap message.

When the update of the feedback information is completed, the operation 1215 is performed. The terminal begins to prepare for xPUCCH transmission and may transmit the bitmap message, created through the xPUCCH, to the base station. The base station may receive and identify the feedback information from the xPUCCH resource configured through the DCI.

In this embodiment, the followings may be further considered.

The followings assume the transmission of the base station with regard to any single terminal.

If the time resource information of HARQ reporting indicated by two or more DL DCIs is the same, the frequency resource information indicated by each DL DCI should be the same. This is because one piece of bitmap information including HARQ feedback information is mapped to one time resource.

If the time resource information and frequency resource information of the HARQ reporting indicated by two or more DL DCIs are the same, the BMI values indicated by each DL DCI may be the same or different.

If the BMIs indicated by the respective DL DCIs are different, multiplexing is performed for the corresponding ACK/NACK bits according to the above-discussed embodiment.

If the BMIs indicated by the respective DL DCIs are the same, the terminal updates the 1 bit obtained by taking the logical AND operation for the corresponding ACK/NACK bits to a location designated by the corresponding BMI. Therefore, in this case, the decoding result of two subframes may be indicated through one bit indicated from the BMI.

In this embodiment, additional operations may be further considered, as follows.

The HARQ reporting time resources indicated by two or more DL DCIs should satisfy the following relationship.

The HARQ reporting time indicated by the DL DCI transmitted in the subframe "n1" is defined as $t_{n1}$, and the HARQ reporting time indicated by the DL DCI transmitted in the subframe "n1+n2" is defined as $t_{n1+n2}$. In this case, it is assumed that n2 is a value greater than 0. A condition, $t_{n1} <= t_{n1+n2}$, should be satisfied between the above time resources. If the DCI detection result of the terminal tells that this condition is not satisfied, an error code may be outputted. Also, the HARQ feedback operation is stopped and related operations may be reset. This means that the feedback time for the preceding subframe is the same as or preceded by the feedback time of the following subframe.

In this embodiment, additional operations may be further considered, as follows.

The UL DCI (i.e., DCI for scheduling the xPUSCH resource) transmitted in the subframe "n" may require retransmission of HARQ reporting that has been previously transmitted. When the base station requests the retransmission, the terminal delivers again the HARQ information, previously transmitted using the xPUCCH resource in the subframe "n-k$_{offset}$" indicated by the UL DCI, to the base station by using the xPUSCH resource scheduled by the UL DCI.

The base station indicates the k$_{offset}$ value to the terminal by using the UL DCI, and the base station may use the k$_{offset}$ value as a command for retransmission by setting it greater than zero. If the k$_{offset}$ value is 0, the terminal does not perform retransmission.

Since the base station may not know exactly which UCIs are transmitted in the subframe "n-k$_{offset}$" by the terminal, the terminal may inform the base station of the types of UCIs transmitted through the xPUCCH in the subframe "n-k$_{offset}$". For example, the terminal may select one of the following four combinations to inform the base station.

HARQ only
HARQ+CSI
HARQ+BSI
No transmission

If the terminal does not transmit the xPUCCH to the base station in the subframe "n-koffset", the terminal selects "No transmission" and provides it to the base station. If the remaining items except "No transmission" are selected, the terminal may transmit HARQ ACK bitmap information corresponding to the items and additional UCI information to the base station. Meanwhile, as described above, only the HARQ information may be sent as the feedback information, or the HARQ information, channel state information (CSI), and the like may be transmitted together. For example, the HARQ information, the CSI, beam state information (BSI), and the like may be transmitted together.

Figure 13:
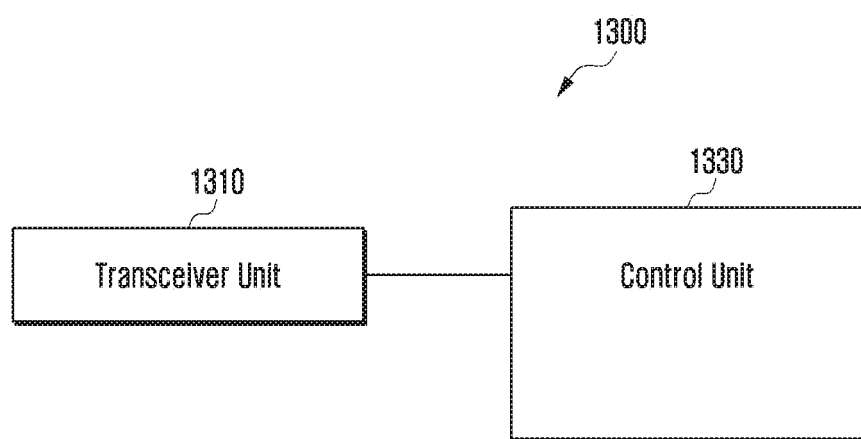
FIG. 13 is a diagram illustrating a terminal according to an embodiment of the present disclosure.

FIG. 13 is a diagram illustrating a terminal according to an embodiment of the present disclosure.

Referring to FIG. 13, a terminal 1300 may include a transceiver unit 1310 and a control unit 1330. The terminal 1300 may transmit and/or receive a signal through the transceiver unit 1310. Also, through the transceiver unit 1310, the terminal 1300 may receive DCI and data and transmit HARQ feedback information. The control unit 1330 may include at least one processor and may control the overall operation of the terminal 1300. The control unit 1330 may be a controller. Specifically, the control unit 1330 may control the operations of the terminal 1300 discussed above in various embodiments. For example, the control unit 1330 may control the operations such as DCI detection, data decoding, information acquisition for HARQ feedback, HARQ information creation, and HARQ information transmission.

According to an embodiment of the present disclosure, the control unit 1330 may control the transceiver unit 1310 to receive a first subframe from a base station, and may detect, from the first subframe, DCI including transmission timing information and frequency resource information for feedback. In addition, the control unit 1330 may create feedback information for data decoding of the first subframe to be transmitted in a second subframe determined based on the DCI, and may control the transceiver unit 1310 to transmit the feedback information, based on a time resource indicated from the transmission timing information and a frequency resource indicated from the frequency resource information in the DCI. The transmission timing information may include information for indicating an index of the second subframe, and the frequency resource information may include frequency information for transmission of the feedback information in an uplink control channel The information for indicating an index of the second subframe may be offset information.

Additionally, the control unit 1330 may create and update a bitmap message. The feedback information may be the bitmap message, and the DCI may include BMI for indicating a specific location of the bitmap message.

Additionally, the control unit 1330 may identify the bitmap message, initialize bits of the bitmap message, and update a decoding result of data contained in the first subframe to a location indicated by the bitmap index information.

Additionally, if a resource for feedback indicated by the DCI of the first subframe is identical with a resource for feedback indicated by the DCI of other subframe, the control unit 1330 may multiplex decoding results of the first subframe and the other subframe into single feedback information. If a resource for feedback indicated by the DCI of the first subframe is identical with a resource for feedback indicated by the DCI of other subframe, a bitmap index contained in the DCI of the first subframe may be different from a bitmap index contained in the DCI of the other subframe.

Additionally, the control unit 1330 may create the bitmap message having a predetermined size and, if the bitmap size is indicated from RRC signaling, create the bitmap message in the indicated size. Also, if information of the bitmap index received from the base station is greater than the bitmap size predetermined or indicated by the base station, the control unit 1330 may determine that there is an error in the DCI including the bitmap index information, discard the DCI, and stop the related operations.

Meanwhile, according to various embodiments of the present disclosure, the terminal 1300 is not limited to the example of FIG. 13 and may be interpreted to be able to perform all the operations of the terminal described with reference to FIGS. 1 to 12.

Figure 14:
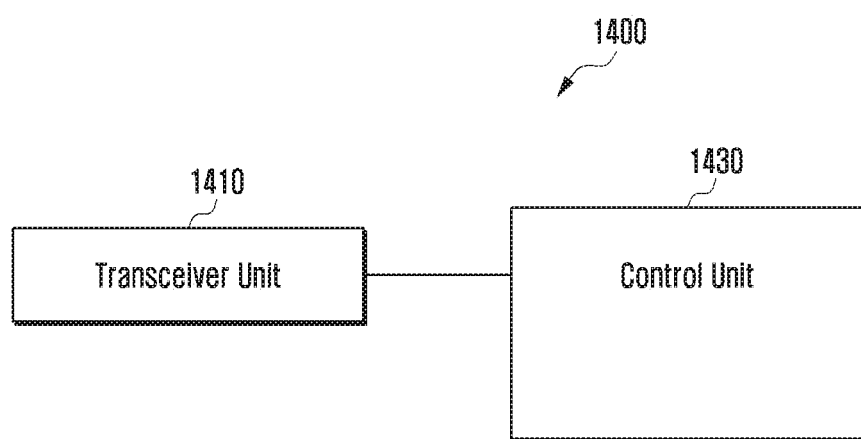
FIG. 14 is a diagram illustrating a base station according to an embodiment of the present disclosure.

FIG. 14 is a diagram illustrating a base station according to an embodiment of the present disclosure.

Referring to FIG. 14, a base station 1400 may include a transceiver unit 1410 and a control unit 1430. The base station 1400 may transmit and/or receive a signal through the transceiver unit 1410. Also, through the transceiver unit 1410, the base station 1400 may transmit DCI and data and receive HARQ feedback information. The control unit 1430 may include at least one processor and may control the overall operation of the base station 1400. The control unit 1430 may be a controller. Specifically, the control unit 1430 may control the operations of the base station 1400 discussed above in various embodiments. For example, the control unit 1430 may control the operations such as DCI detection, data decoding, information acquisition for HARQ feedback, HARQ information creation, and HARQ information transmission.

According to an embodiment of the present disclosure, the control unit 1430 may create DCI including transmission timing information and frequency resource information for feedback and data in a first subframe. Also, the control unit 1430 may control the transceiver unit 1410 to transmit the first subframe containing the DCI and the data to a terminal, and may control the transceiver unit 1410 to receive feedback information from the terminal, based on a time resource indicated from the transmission timing information and a frequency resource indicated from the frequency resource information in the DCI. The transmission timing information may include information for indicating an index of the second subframe, and the frequency resource information may include frequency information for transmission of the feedback information in an uplink control channel The information for indicating an index of the second subframe may be offset information. The feedback information may be the bitmap message, and the DCI may include BMI for indicating a specific location of the bitmap message.

Additionally, the control unit 1430 may check, from the bitmap message received from the terminal, whether a decoding result of data contained in the first subframe is updated to a location of the bitmap message indicated by the bitmap index information.

Additionally, if a resource for feedback indicated by the DCI of the first subframe is identical with a resource for feedback indicated by the DCI of other subframe, decoding results of the first subframe and the other subframe are multiplexed into single feedback information. Therefore, when one bitmap message is received, the base station may identify the HARQ feedback results of a plurality of subframes.

Additionally, if a resource for feedback indicated by the DCI of the first subframe is identical with a resource for feedback indicated by the DCI of other subframe, a bitmap index contained in the DCI of the first subframe may be different from a bitmap index contained in the DCI of the other subframe. When the same feedback resource is indicated through the DCIs of different subframes, the control unit 1430 may configure differently the BMI values contained in the different DCIs. Through this, feedback information for a plurality of subframes may be multiplexed into one bitmap message.

Meanwhile, according to various embodiments of the present disclosure, the base station 1400 is not limited to the example of FIG. 14 and may be interpreted to be able to perform all the operations of the base station described with reference to FIGS. 1 to 12.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving, on a first time resource, first downlink control information (DCI) including first transmission timing information for feedback;
   receiving, on a second time resource, second DCI including second transmission timing information for feedback; and
   transmitting, to a base station, feedback information for a data channel scheduled based on the first DCI and a data channel scheduled based on the second DCI, wherein decoding results of the data channel of the first time resource and the data channel of the second time resource are multiplexed in the feedback information based on a time resource indicated by the first transmission timing information identical with a time resource indicated by the second transmission timing information,
   wherein first information associated with a bitmap for the feedback information included in the first DCI is different from second information associated with a bitmap for the feedback information included in the second DCI, based on the time resource indicated by the first transmission timing information identical with the time resource indicated by the second transmission timing information.

2. The method of claim 1, wherein the first transmission timing information includes information for indicating the time resource.

3. The method of claim 1, further comprising:
   receiving information associated with a size of the bitmap.

4. The method of claim 3, wherein the transmitting the feedback information includes:
   identifying the bitmap;
   initializing bits of the bitmap; and
   updating a decoding result of data channel scheduled by the first DCI to a location indicated by the first information.

5. The method of claim 1, wherein the time resource indicated by the second transmission timing information is no earlier than the time resource indicated by the first transmission timing information, based on the first time resource being earlier than the second time resource.

6. A terminal in a wireless communication system, the terminal comprising:
   a transceiver; and
   at least one processor configured to:
      receive, from a first time resource, first downlink control information (DCI) including first transmission timing information for feedback,
      receive, on a second time resource, second DCI including second transmission timing information for feedback, and
      transmit, to a base station, feedback information for a data channel scheduled based on the first DCI and a data channel scheduled based on the second DCI, wherein decoding results of the data channel of the first time resource and the data channel of the second time resource are multiplexed in the feedback information based on a time resource indicated by the first transmission timing information identical with a time resource indicated by the second transmission timing information,
   wherein first information associated with a bitmap for the feedback information included in the first DCI is different from second information associated with a bitmap for the feedback information included in the second DCI, based on the time resource indicated by the first transmission timing information identical with the time resource indicated by the second transmission timing information.

7. The terminal of claim 6, wherein the first transmission timing information includes information for indicating the time resource.

8. The terminal of claim 6, wherein the at least one processor is further configured to receive information associated with a size of the bitmap.

9. The terminal of claim 8, wherein the at least one processor is further configured to:
   identify the bitmap,
   initialize bits of the bitmap, and
   update a decoding result of data channel scheduled by the first DCI to a location indicated by the first information.

10. The terminal of claim 6, wherein the time resource indicated by the second transmission timing information is no earlier than the time resource indicated by the first transmission timing information, based on the first time resource being earlier than the second time resource.

11. A method performed by a base station in a wireless communication system, the method comprising:
- transmitting, on a first time resource to a terminal, first downlink control information (DCI) including first transmission timing information for feedback;
- transmitting, on a second time resource to the terminal, second DCI including second transmission timing information for feedback; and
- receiving feedback information from the terminal,
- wherein decoding results of a data channel of the first time resource and a data channel of the second time resource are multiplexed in the feedback information and first information associated with a bitmap for the feedback information included in the first DCI is different from second information associated with a bitmap for the feedback information included in the second DCI, based on a time resource indicated by the first transmission timing information identical with a time resource indicated by the second transmission timing information.

12. The method of claim 11, wherein the first transmission timing information includes information for indicating the time resource.

13. The method of claim 11, wherein information associated with a size of the bitmap is indicated by the base station.

14. The method of claim 13, wherein a decoding result of data channel scheduled by the first DCI to a location indicated by the first information.

15. The method of claim 11, wherein the time resource indicated by the second transmission timing information is no earlier than the time resource indicated by the first transmission timing information, based on the first time resource being earlier than the second time resource.

16. A base station in a wireless communication system, the base station comprising:
- a transceiver; and
- at least one processor configured to:
  - transmit, on a first time resource to a terminal via the transceiver, first downlink control information (DCI) including first transmission timing information for feedback,
  - transmit, on a second time resource to the terminal via the transceiver, second DCI including second transmission timing information for feedback, and
  - receive, from the terminal via the transceiver, feedback information,
- wherein decoding results of a data channel of the first time resource and a data channel of the second time resource are multiplexed in the feedback information and first information associated with a bitmap for the feedback information included in the first DCI is different from second information associated with a bitmap for the feedback information included in the second DCI, based on a time resource indicated by the first transmission timing information identical with a time resource indicated by the second transmission timing information.

17. The base station of claim 16, wherein the first transmission timing information includes information for indicating the time resource.

18. The base station of claim 16, wherein information associated with a size of the bitmap is indicated by the base station.

19. The base station of claim 18, wherein a decoding result data channel scheduled by the first DCI to a location indicated by the first information.

20. The base station of claim 16, wherein the time resource indicated by the second transmission timing information is no earlier than the time resource indicated by the first transmission timing information, based on the first time resource being earlier than the second time resource.

* * * * *